(12) United States Patent
Jellinek

(10) Patent No.: US 6,934,767 B1
(45) Date of Patent: Aug. 23, 2005

(54) AUTOMATICALLY EXPANDING ABBREVIATED CHARACTER SUBSTRINGS

(75) Inventor: Herbert D. Jellinek, Aptos, CA (US)

(73) Assignee: FusionOne, Inc., San Jose, CA (US)

(*) Notice: Subject to any disclaimer, the term of this patent is extended or adjusted under 35 U.S.C. 154(b) by 536 days.

(21) Appl. No.: 09/664,875

(22) Filed: Sep. 19, 2000

Related U.S. Application Data

(63) Continuation-in-part of application No. 09/652,761, filed on Aug. 31, 2000, now Pat. No. 6,360,252.

(60) Provisional application No. 60/155,024, filed on Sep. 20, 1999.

(51) Int. Cl.[7] .............................................. G06F 15/16
(52) U.S. Cl. ...................... 709/247; 235/375; 341/67; 345/467; 345/811; 455/466; 704/8; 704/9; 707/5; 707/10
(58) Field of Search ........................................ 709/247

(56) References Cited

U.S. PATENT DOCUMENTS

| | | | |
|---|---|---|---|
| 4,887,212 A * | 12/1989 | Zamora et al. | |
| 5,111,398 A * | 5/1992 | Numberg et al. | |
| 5,146,221 A * | 9/1992 | Whiting et al. | |
| 5,778,361 A * | 7/1998 | Nanjo et al. | |
| 5,794,228 A | 8/1998 | French et al. | |
| 5,804,803 A * | 9/1998 | Cragun et al. | |
| 5,818,437 A * | 10/1998 | Grover et al. | .............. 345/811 |
| 5,970,490 A * | 10/1999 | Morgenstern | |
| 5,971,277 A | 10/1999 | Cragun et al. | |
| 5,995,118 A * | 11/1999 | Masuda | |
| 6,286,053 B1 * | 9/2001 | Van Peursem et al. | |
| 6,473,621 B1 * | 10/2002 | Heie | .......................... 455/466 |

* cited by examiner

Primary Examiner—Hosain Alam
Assistant Examiner—Michael Y Won
(74) Attorney, Agent, or Firm—Vierra Magen Marcus Harmon & DeNiro LLP

(57) ABSTRACT

A server machine receives an input string of characters from a client machine, and the string includes at least one abbreviated substring preceded and followed by word delimiters. Each abbreviated substring represents an expanded substring. The server machine automatically finds one of the abbreviated substrings based on the preceding and following word delimiters, determines that it is one of a set of abbreviated substrings, and produces an expanded version of the string of characters with the abbreviated substring replaced by its expanded substring. The case of the beginning character of the expanded substring can be the same as that of the abbreviated substring. The expanded substring can depend on time, such as the current time.

14 Claims, 13 Drawing Sheets

AUTOMATICALLY EXPANDING ABBREVIATED CHARACTER SUBSTRINGS

RELATED APPLICATIONS

This patent application:
is a continuation-in-part of U.S. patent application entitled TRANSFERRING E-MAIL ATTACHMENTS TO DEVICES FOR RENDERING, U.S. application Ser. No. 09/652,761, filed on Aug. 31, 2000, now U.S. Pat. No. 6,360,252, which claims the benefit of U.S. Provisional Patent Application No. 60/155,024, filed on Sep. 20, 1999, entitled METHOD AND APPARATUS FOR PROVIDING MOBILE ACCESS TO COMPUTER NETWORKS; and
claims the benefit of U.S. Provisional Patent Application No. 60/155,024, filed on Sep. 20, 1999, entitled METHOD AND APPARATUS FOR PROVIDING MOBILE ACCESS TO COMPUTER NETWORKS, the contents of which are hereby incorporated by reference in their entirety.
This patent application is also related to:
U.S. patent application entitled PROVIDING ADDRESS BOOK INFORMATION WHEN A LINK FOR AN ADDRESS IN E-MAIL IS SELECTED, application Ser. No. 09/665,438, filed on the same day herewith; and
U.S. patent application entitled PERFORMING SERVER ACTIONS USING TEMPLATE WITH FIELD THAT CAN BE COMPLETED WITHOUT OBTAINING INFORMATION FROM A USER, application Ser. No. 09/665,315, filed on the same day herewith, the contents of which are hereby incorporated by reference in their entirety.

FIELD OF THE INVENTION

The invention relates to techniques for automatically expanding an abbreviated substring that occurs in a string of characters.

BACKGROUND OF THE INVENTION

It is becoming increasingly important to be able to access computer-based services using devices other than conventional desktop computers. Such devices include, for example, mobile phones and personal digital assistants (PDAs). Such devices are usually smaller and more portable than their desktop counterparts. However, this portability comes at a price. In particular, such devices typically share three disadvantages relative to conventional desktop computers: they have more cumbersome input mechanisms, they have slower (usually wireless) connections to servers, and they have less on-board computing power.

With respect to input mechanisms, desktop computers typically include query keyboards. Although a qwerty keyboard may provide near optimal performance for a skilled user, speed and accuracy problems can arise in character input by an unskilled user. Speed and accuracy problems can also arise even for a skilled qwerty keyboard user using a client machine with a numeric keypad, a pen-based input device, or other manual character input device that is different from a qwerty keyboard.

Problems can also arise in input of characters through a low speed connection between a client machine and a server machine—dynamic expansion and other conventional techniques for accelerating character input may be impractical because the client machine may not be capable of performing expansion and the slow connection may prevent the server from providing feedback at acceptable speeds. These and similar problems in character input are referred to generally herein as "character input problems".

Based on the foregoing, it is clearly desirable to provide techniques that address the character input problems. In particular, it is desirable to provide techniques that facilitate character input at devices with relatively cumbersome input mechanisms, relatively slow connection speeds, and/or relatively low on-board computer power.

SUMMARY OF THE INVENTION

Techniques are provided to reduce the character input problems by automatically expanding, at a server, abbreviated character substrings that are input at a client. The techniques employ a server machine, and a user can input characters using a client machine with a character input device, such as a desktop or laptop computer or workstation, a mobile phone, or PDA. In response to an input string of characters, the server automatically finds an abbreviated substring and replaces it with an expanded substring. The server can use standard word delimiters such as word separator spaces to identify substrings and can then compare each substring with a set of abbreviated substrings. As a result, the techniques can be implemented without special characters or other special user input to indicate abbreviated substrings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
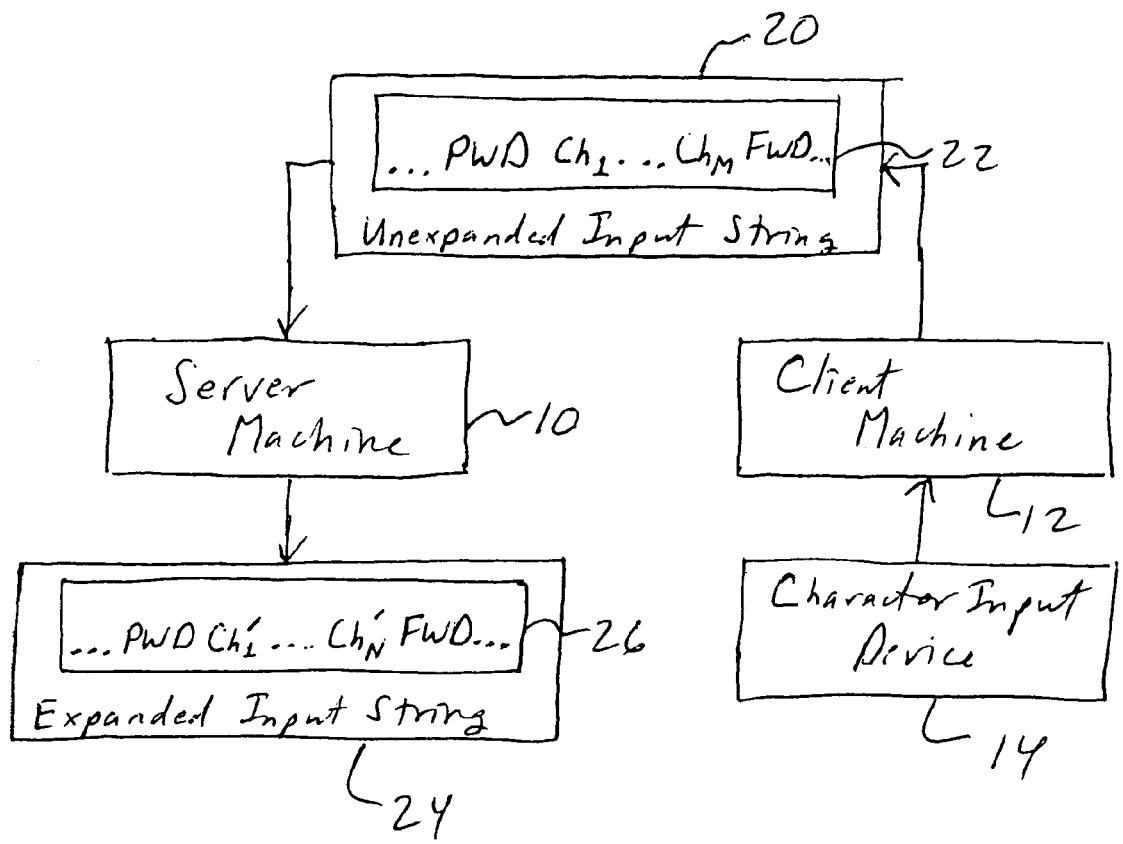
FIG. 1 is a flow diagram illustrating operations of a server machine in automatically expanding an abbreviated substring.

A method and apparatus are described for techniques to facilitate character input. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided in which a server machine has access to one or more mappings between abbreviated substrings and expanded substrings. Each mapping may correspond to an individual user or to a specified group of users. Alternatively, the server machine may simply store one mapping for all users of the server machine, or a different mapping for each of a plurality of services offered by the server.

According to one embodiment, the server machine receives an unexpanded input string of characters from a client machine that has a character input device. The unexpanded input string includes at least one abbreviated substring preceded and followed, in the unexpanded input string, by word delimiters.

Server machine automatically finds one of the abbreviated substrings based on the preceding and following word delimiters. The server machine determines the appropriate mapping to apply, which in some embodiments is based on the identity of the user, the group of the user, and/or the service involved. When the appropriate mapping has been identified, the server computer uses the mapping to determine the expanded substring that corresponds to the abbreviated substring. The server machine then produces an expanded input string that is a version of the unexpanded input string, but with the abbreviated substring replaced by the expanded substring to which it corresponds.

The unexpanded input string can include an abbreviated substring that is preceded and followed by non-alphanumeric characters that are word delimiters. The non-alphanumeric characters can include a space, a beginning of string character, and an end of string character.

One or more of the abbreviated substrings can represent an expanded substring that includes more characters than the abbreviated substring. One or more of the abbreviated substrings can represent an expanded substring that begins with the same character. The server computer can determine the case of the beginning character in the abbreviated substring and give the same case to the beginning character in the expanded substring.

One or more of the abbreviated substrings can represent expanded substrings that depend on time. The method can perform a computation to obtain an expanded substring based on the current time. The method can then produce the expanded input string with the abbreviated substring replaced by the expanded substring based on the current time.

The techniques can also be implemented in a server machine with a processor and connecting circuitry for connecting the processor to a user's client machine that has a character input device. The processor can receive an unexpanded input string of characters from the client machine, as described above. The processor can automatically find an abbreviated substring, determine that it is one of the set, and produce an expanded input string, again as described above.

The techniques can also be implemented in an article of manufacture with stored instruction data defining instructions that a server machine's processor can execute. In executing the instructions, the processor can operate as described above.

Similarly, the techniques can be implemented in a method of operating a source machine to transfer data to a server machine that includes a processor. The source machine can establish a network connection to the server machine and can transfer instruction data as described above to the server machine.

In comparison with conventional expansion techniques, the techniques are advantageous because they do not rely on a special prefix for abbreviations. A special prefix reduces the available number of abbreviations by ruling out abbreviations with prefixes that are also abbreviations. The techniques therefore allow a different set of possible abbreviations, a set that should not include words that will actually be used but a set that can include various abbreviations that all begin with the same prefix. The techniques are therefore more flexible in the abbreviations that are acceptable in situations where it is desirable to have more than one abbreviation with the same prefix.

Terms and Terminology

The following terms are used herein to describe various embodiments of the invention:

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between two components.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "processor" is a component of circuitry that responds to input signals by performing processing operations on data and by providing output signals. A processor may include one or more central processing units or other processing components.

A processor performs an operation or a function "automatically" when it performs the operation or function independent of concurrent human control.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data.

An item of data "indicates" a thing, an event, or a characteristic when the item has a value that depends on the existence or occurrence of the thing, event, or characteristic or on a measure of the thing, event, or characteristic.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation.

An "image output device" is a device that can provide output defining an image. A "display" is an image output device that provides information in a visible form. To "present an image" on a display is to operate the display so that a human can perceive the image.

An item of data "defines" an image when the item of data includes sufficient information to produce the image.

A "page" is an image that can be perceived as a single page of a form or a sheet. A "web page" is a page that satisfies the constraints applicable to the World Wide Web (WWW) user interface.

An operation "creates" a page, such as a web page, when the operation produces an item of data defining the page. An operation "transmits" a page when the operation transmits an item of data defining the page. An operation "presents" a page when the operation presents one or more images that include information from an item of data defining the page.

A "selectable item" is a display feature that is perceived as a bounded display area that can be selected. Hyperlinks and menu items are examples of selectable items. A selectable item "indicates" a thing, an event, or a characteristic when the selectable item includes text or other visible information indicating the thing, event, or characteristic. A selectable item "identifies" a thing, an event, or a characteristic that is one of a set when the selectable item includes text or other visible information indicating the thing, event, or characteristic and not indicating any of the other elements in the set.

The term "select", when used in relation to a selectable item, means an action by a user that uniquely indicates the selectable item.

The term "machine" refers herein to a machine that includes at least one processor and its input/output circuitry.

The terms "server machine" (or "server"), "client machine" (or "client"), and "request" describe a relationship between machines that can be connected through a network: A "server machine" is a machine that performs services in response to "requests" it receives from one or more "client machines". In this context, a "request" is an item of data transferred from a client to a server that has a value indicating a service or operation to be performed by the server.

A connection between a server machine and a client machine is a "low bandwidth connection" in a given context if the connection has insufficient capacity to transfer items of data at a desired rate with perfect fidelity. The capacity of the connection may be limited, for example, by software or hardware constraints, with storage capacity being one example of a hardware constraint that can reduce capacity. In some contexts, a low bandwidth connection is any connection with a transfer speed below 56 kilobits per second. In contexts in which items of data are transferred for presentation to a user, a low bandwidth connection could be a connection that is not always able to transfer items of data at a sufficient speed to obtain the intended perceptual effect.

An "e-mail service" is a service provided by a server machine by which the server machine can transfer a human-readable message, referred to as an "e-mail message", electronically from a client machine, referred to as the "sending machine", to one or more client machines, referred to as "recipient machines". An e-mail message is typically composed through a user interface provided by the sending machine and is typically read through a user interface provided by a recipient machine.

An "e-mail item" is an item of data that defines an e-mail message. An e-mail item can be transferred from a sending machine to a server machine and from a server machine to a recipient machine.

A "character" is a symbol. An "alphanumeric" character is a symbol representing either a letter or a number. A "non-alphanumeric character" is a symbol that does not represent a letter or a number, such as a space or other punctuation mark or a character representing the beginning or ending of a string or substring of characters, such as beginning or ending of line, of paragraph, or of file.

The "case" of a letter refers to its capitalization, and is either upper case or lower case.

The terms "word" and "word delimiter" have related meanings: A character string that forms a meaningful multi-word expression in a language includes a sequence of words separated by word delimiters. The words are character strings that can indicate semantic meaning, while the word delimiters are character strings that can indicate relationships between words or between subsequences of words. Examples of word delimiters in English include spaces and other punctuation marks, with marks such as commas, periods, semicolons, and colons usually being followed by one or two spaces.

A "character input device" is a user input device such as a keyboard, keypad, or touchscreen that responds to user actions by providing signals indicating characters.

A substring of a character string is an "abbreviated substring" in a given system, such as a server machine, if the system has stored data that relates the substring to an expanded form; the expanded form may be referred to as the substring's "expanded substring". It may also be said that the abbreviated substring "represents" its expanded substring. An expanded substring typically includes more characters than the abbreviated substring that represents it.

A character string is "unexpanded" if it includes at least one abbreviated substring. A character string is "expanded" if it is a version of an unexpanded string in which each abbreviated substring has been replaced by the expanded substring it represents.

An expanded substring "depends on time" if, within the same mapping, the expanded substring is represented by an abbreviated substring at one or more times and is not represented by the abbreviated substring at other times. For example, the expanded substring that corresponds to a particular abbreviated substring may vary based on the current time.

A "version" of a first item such as a character string is a second item that is obtained using the first item and that includes information from the first item. In general, the second item may be identical to the first item, or it may be modified by omitting parts of the first item, by changing parts of the first item, by converting the first item from one form or format to another, or by other processes that result in a modified version. For example, a version of a character string that includes abbreviated substrings might have each abbreviated substring replaced by the expanded substring it represents.

System Overview

Figure 2:
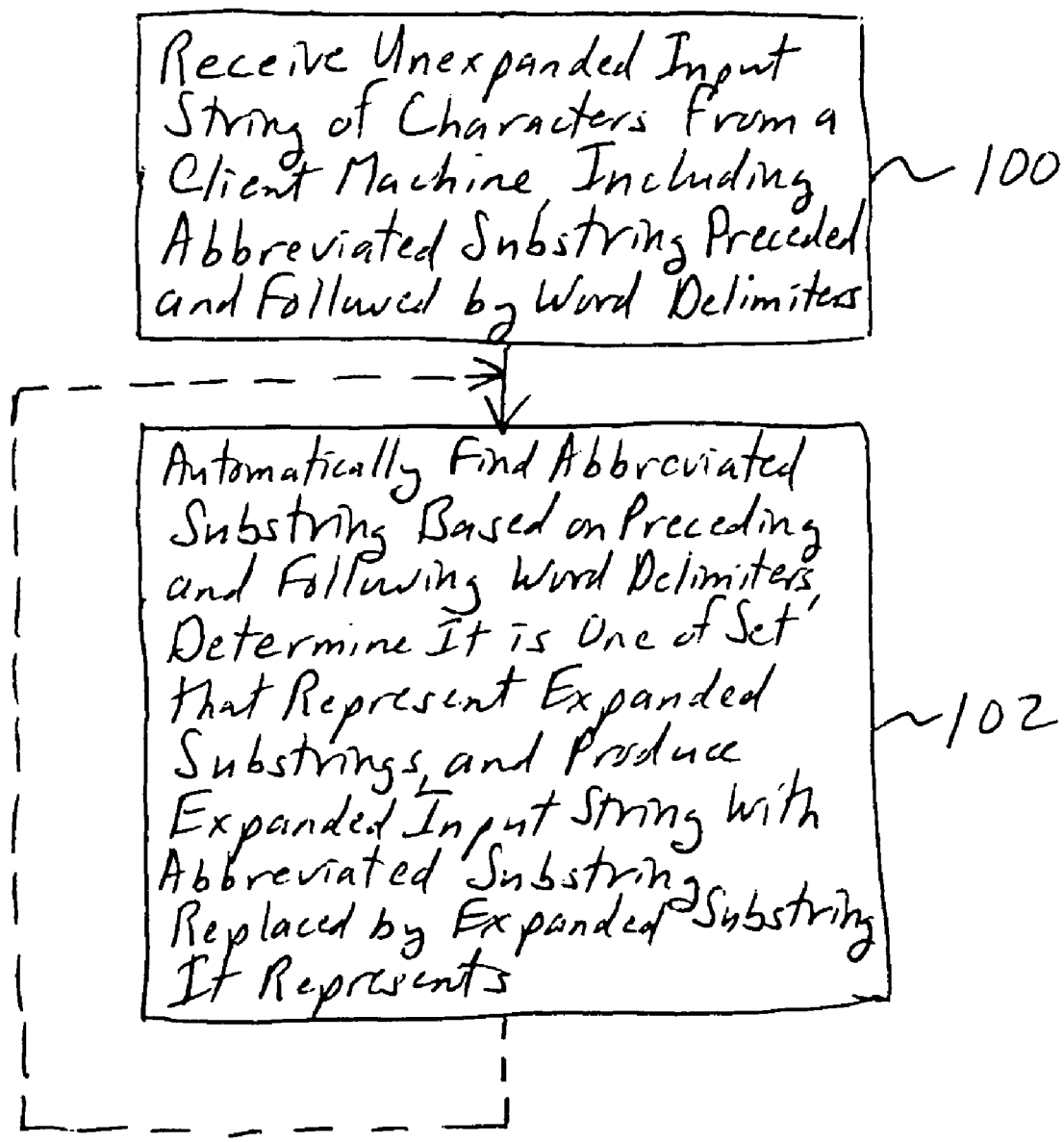
FIG. 2 is a flow chart of a general method by which a server machine automatically expands an abbreviated substring.
Figure 3:
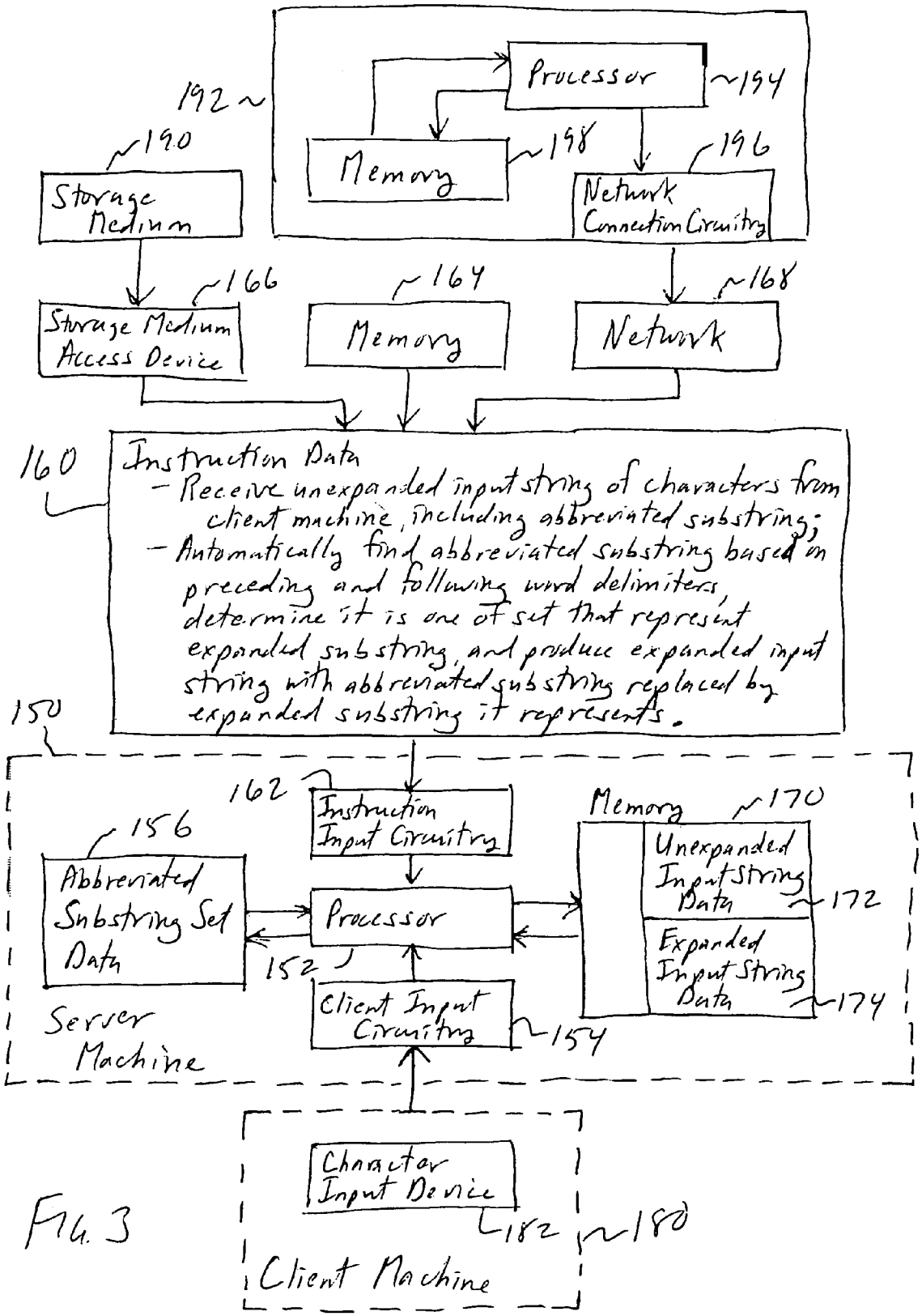
FIG. 3 is a schematic diagram showing general components of a system in which a server machine can automatically expand an abbreviated substring.

FIGS. 1–3 show general features of an embodiment of the invention. In FIG. 1, server machine 10 performs operations that expand an input string of characters received from client machine 12, which includes character input device 14.

Server machine 10 receives unexpanded input string 20 from client machine 12. Unexpanded input string 20 includes excerpt 22. Excerpt 22 includes a preceding word delimiter (PWD) followed by a substring of M non-delimiter characters ($Ch_1$ through $Ch_M$) and a following word delimiter (FWD). The substring of M characters is an abbreviated substring, one of a set of abbreviated substrings that represent expanded substrings.

Server machine 10 automatically finds the abbreviated substring of M characters based on the preceding and following word delimiters. Server machine determines that the abbreviated substring is one of the set of abbreviated substrings. Server machine 10 produces expanded input string 24, a version of unexpanded input string 20 that includes excerpt 26. As shown, excerpt 26 includes PWD followed by a substring of N characters ($Ch_1'$ through $Ch_N'$) and FWD. In other words, server 10 has replaced the abbreviated substring of M characters shown in excerpt 22 by the expanded substring of N characters that the abbreviated substring represents.

In FIG. 2, the act in box 100 begins by receiving an unexpanded input string of characters from a client machine that includes a character input device. The unexpanded input string includes at least one abbreviated substring, and each abbreviated substring is preceded and followed in the unexpanded input string by word delimiters. Each abbreviated substring is one of a set of abbreviated substrings that represent expanded substrings.

The act in box 102 automatically finds one of the abbreviated substrings based on the preceding and following word delimiters. After identifying the appropriate abbreviated substring-to-expanded-substring mapping, the act in box 102 also determines that the abbreviated substring is one of the set of abbreviated substrings in the mapping, and produces an expanded input string that is a version of the unexpanded input string with the abbreviated substring replaced by an expanded substring it represents.

As suggested by the dashed line in FIG. 2, the act in box 102 could be repeated for each abbreviated substring in the unexpanded input string.

Server machine 150 in FIG. 3 includes processor 152 connected for receiving signals from a user's client machine 180 through client input circuitry 154. Processor 152 can also be connected for accessing abbreviated substring set data 156, which define the set of abbreviated substrings and can also indicate, for each abbreviated substring, the expanded substring it represents.

Processor 152 is also connected for receiving instruction data 160 indicating instructions through instruction input circuitry 162, which can illustratively provide instructions received from connections to memory 164, storage medium access device 166, or network 168.

Finally, processor 152 can also be connected to memory 170, illustratively storing unexpanded input string data 172 and expanded input string data 174.

Client machine 180 includes character input device 182, such as a keyboard.

In executing the instructions indicated by instruction data 160, processor 152 receives an unexpanded input string of characters as described above from a client machine that includes a character input device. Processor 152 automatically finds one of the abbreviated substrings based on the preceding and following word delimiters, determines that the abbreviated substring is one of the set of abbreviated substrings, and produces an expanded input string that is a version of the unexpanded input string with the abbreviated substring replaced by an expanded substring it represents.

Processor 152 could obtain unexpanded input string data 172 and expanded input string data 174, respectively defining the unexpanded and expanded versions of an input string received from client machine 180.

As noted above, FIG. 3 illustrates three possible sources from which instruction input circuitry 162 could receive data indicating instructions—memory 164, storage medium access device 166, and network 168.

Memory 164 could be any conventional memory within server machine 150, including random access memory (RAM) or read-only memory (ROM), or could be a peripheral or remote memory device of any kind. For example, memory 164 and memory 170 could be implemented in a single memory device.

Storage medium access device 166 could be a drive or other appropriate device or circuitry for accessing storage medium 190, which could, for example, be a magnetic medium such as a set of one or more tapes, diskettes, or floppy disks; an optical medium such as a set of one or more CD-ROMs; or any other appropriate medium for storing data. Storage medium 190 could be a part of server machine 150, a part of another server or other peripheral or remote memory device, or a software product. In each of these cases, storage medium 190 is an article of manufacture that can be used in server machine 150. Data units can be positioned on storage medium 190 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 192. Processor 194 in machine 192 can establish a connection with processor 152 over network 168 through network connection circuitry 196 and instruction input circuitry 162. Either processor could initiate the connection, and the connection could be established by any appropriate protocol.

Then processor 194 can access instruction data stored in memory 198 and transfer the instruction data over network 168 to processor 152 so that processor 152 can receive instruction data 160 from network 168. Instruction data 160 can then be stored in memory 170 or elsewhere by processor 152, and can be executed.

The general features described above could be implemented in numerous ways on various server machines to automatically expand abbreviated substrings. The initial implementation described below has been successfully implemented on several computer CPU architectures and operating systems, including Microsoft Windows NT 4.0/Intel x86, Sun Solaris 7/Intel x86, Sun Solaris 7/Sun UltraSPARC running atop an Apache 1.3 Web server using the Apache JServ module to run a custom set of servlets compiled from Java programming language source code. The initial implementation described below uses the WAP (Wireless Application Protocol) protocols, including WML (Wireless Markup Language) 1.0 and WML 1.1, to present information to and receive information from mobile client devices.

System Architecture

In the initial implementation, a server computer exchanges information with client machines that are cellular telephones or PDAs, providing access to information through a network. The server provides a number of services to users of the client machines, including but not limited to access to calendars; access to electronic mail folders, messages, and attachments such as documents; access to chat rooms; instant messaging; and access to address books. The server can reformat all information for display in a manner appropriate to the information, the client machine, and the user.

The server can provide secure wireless access directly to corporate and personal information, providing transparent, ubiquitous, and live management of calendars, e-mail, chat rooms, instant messaging, address books, and other server-based tools. As a result, a user can have one e-mail address, one calendar, and one address book no matter where the user is. A user with access to a client machine can work directly on his or her own network without synchronizing information among various intermediary networks. The user's network identity can be portable and unbounded.

Figure 4:
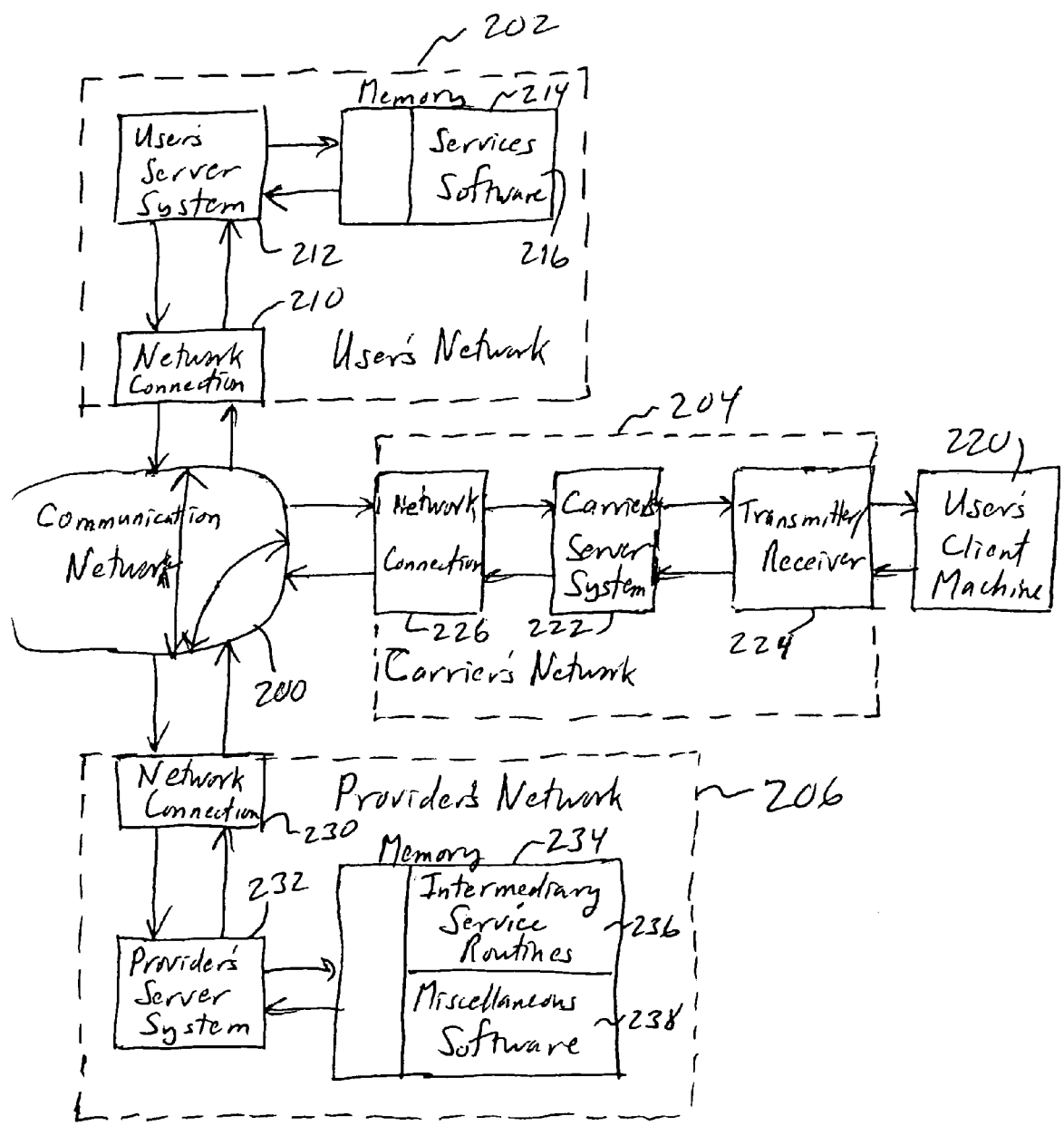
FIG. 4 is a schematic diagram showing components of a system in which an intermediary server (IMS) provides services to a user of a client machine.

FIG. 4 shows an architecture for wireless access to an individual's primary server that eliminates the need for separate identities. In the illustrated architecture, a wireless device becomes a live terminal directly linked to a network in a secure fashion. Therefore, it is irrelevant whether the individual user is accessing e-mail, a calendar, or other services from a desktop personal computer directly connected to the network, from a laptop or other portable computer linked to the network by a landline, or from a wireless device such as a cellular phone, PDA, or interactive pager.

In FIG. 4, communication network 200 provides communication links between three components—user's network 202, carrier's network 204, and provider's network 206. These components can be implemented with conventional techniques, except as noted below, and communication network 200 could be the public Internet, a private intranet, or another suitable communication network.

User's network 202 can be a conventional intranet or a conventional network of an Internet service provider through which a user has access to communication network 200. Network 202 includes network connection 210 and user's server system 212, which could include one or more server machines providing local and remote users with conventional network services such as an IMAP4 server for mail storage, a POP3 server for SMTP mail transmission, an LDAP server for directory or address book maintenance, a chat server, and so forth. Memory 214 illustratively stores services software 216 which a server machine could execute to provide services.

Carrier's network 204 can be a conventional network of a communication provider such as a telephone provider, cellular provider, paging company, etc., through which the user has communication services using client machine 220. Client machine 220 could, for example, be a wireless telephone, a PDA, a laptop or other portable computer, a pager, or any other machine capable of functioning as a client communicating with carrier's server system 222 in carrier's network 204 through transmitter/receiver 224. In the current implementation, client machine 220 has been successfully implemented with a conventional wireless telephone such as a Motorola P7389 or a Nokia 7110 executing a conventional Wireless Markup Language (WML) browser such as Phone.com's UP Browser 3.1 or UP Browser 4.0, and experiments have shown that client machine 220 could be implemented with a PDA such as a Palm Pilot V, but client machine 220 could be any other suitable machine with any other suitable user interface. The link between client machine 220 and transmitter/receiver 224 could thus be implemented with WAP or any other suitable protocol and could be provided over a wireless, wired, or hybrid connection.

In the architecture in FIG. 4, carrier's network also includes network connection 226, to provide connection between client machine 220 and communication network 200. Provider's network 206 similarly includes network connection 230. Communications between network connections 210, 224, and 230 can be implemented in a conventional manner, and can be protected using a Virtual Private Network (VPN) or another suitable protocol for providing secure links through communication network 200. Each of the Internet connections can be implemented with a firewall and other appropriate security protections.

Provider's network 206 also includes provider's server system 232, which can be implemented with one or more conventional machines such as a Sun Microsystems Enterprise 450. Machines in provider's server system 232 can provide conventional network services such as an Internet Mail Access Protocol 4 (IMAP4) server or other appropriate server for mail storage and retrieval, a POP3 server employing Simple Mail Transfer Protocol (SMTP) or other appropriate server for mail transmission, a Lightweight Directory Access Protocol (LDAP) server or other appropriate server for directory or address book maintenance, a chat server, and so forth. In addition, in the current implementation, provider's server system 232 provides an intermediary server (IMS) implemented with an Apache 1.3 Web server using the Apache JServ module running a custom set of servlets. Memory 234 illustratively stores intermediary services software 236 which a server machine could execute to provide intermediary services and miscellaneous software 238 which a server machine could execute to provide other services or to perform other functions.

Figure 5:
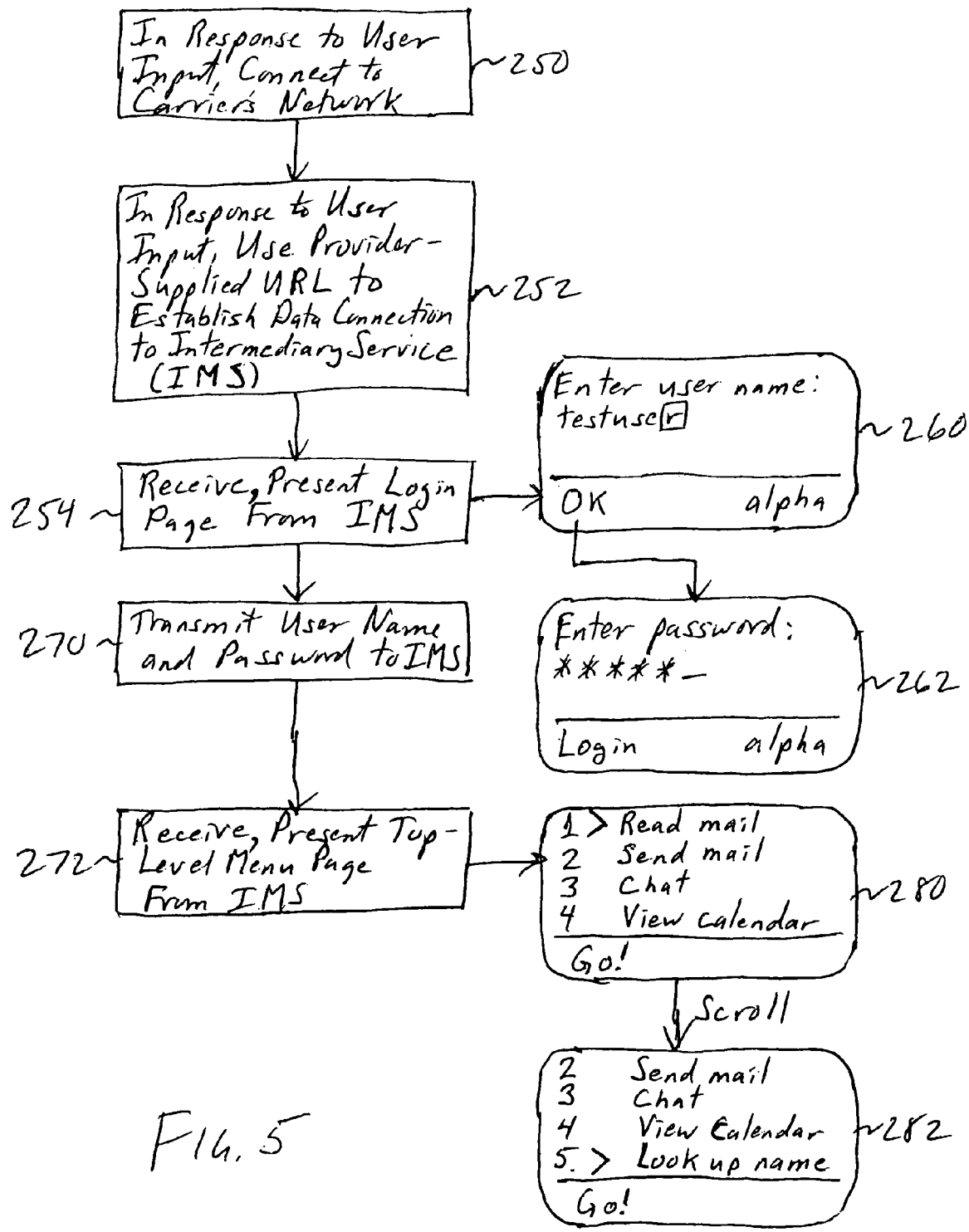
FIG. 5 is a flow chart showing operations of a client machine in establishing connection to the IMS in the system of FIG. 4.

As suggested by the bi-directional arrows inside communication network 200, the IMS acts as an intermediary during communication between client machine 220 and user's server system 212. FIG. 5 illustrates operations of client machine 220 in establishing connection with the IMS, making it possible for the user to request intermediary services.

In box 250, in response to user input, client machine 220 establishes connection to carrier's network 204. This can be accomplished in a conventional way, such as by transmitting a dial-in number that the user manually enters or selects, such as from a menu showing numbers stored in memory of client machine 220.

When connected to carrier's network 204, in response to further user input, client machine 220 uses a provider-supplied Universal Resource Locator (URL) to establish a data connection to the IMS, as shown in box 252. Here again, the user can manually enter the URL or can select it, such as from a menu of stored URLs. A server in carrier's server system 222 responds to the URL by establishing the data connection between client machine 220 and the IMS, performing conventional operations, and submits the URL to the IMS.

In response to the URL, the IMS sends a WML login or authentication page to client machine 220, enabling the user to log into the IMS. Client machine 220 receives and presents the login page, in box 254. For example, client machine 220 can present a first part of the login page requesting that the user enter a user name, as shown by display image 260. When the user has entered a user name, such as by pressing the numeric buttons on the keypad of a wireless telephone, the user can press a button adjacent the "OK" label to store the user name temporarily and to obtain display of a second part of the login page. In response, client machine 220 can present the second part of the login page requesting that the user enter a password, as shown by display image 262. When the user has entered a password, illustratively disguised by asterisks, the user can press a button adjacent the "Login" label to request that the client machine 220 transmit the user name, here "testuser", and the password to the IMS.

In response to the user pressing the button labeled "Login", client machine 220 transmits the user name and password to the IMS using the standard WML and Hypertext Transfer Protocol (HTTP) mechanism "POST", as shown in box 270.

In response to the user name and password, the IMS uses them to access a database of authorized users. If the user name and password are both valid and match, data is stored indicating that the user is "logged in". Then, the IMS sends a WML top-level menu page to client machine 220, listing the main set of operations the user can perform through the IMS.

Login could be implemented in various ways other than with the specific features shown in boxes display images 260 and 262 and in box 270. For example, a variation has been implemented in which a first part of the login page requests that the user enter a personal identification number (PIN) and a second part requests that the user enter a user identifier (ID). In this implementation, the PIN and ID are used in login rather than a user name and password.

Client machine 220 receives and presents the top-level menu page, in box 272. For example, as shown by display image 274, client machine 220 can present a first part of the top-level menu page showing the beginning of the list of operations, as shown by display image 280. If the device's display is not large enough to display all of the menu items, when the user requests scrolling, such as by pressing a scroll button, client machine 220 can present a second part of the top-level menu page with a subsequent part of the list of operations, as shown by display image 282.

As illustrated, client machine 220 presents the top-level menu page as a list of numbered lines, each line including a short description of a service such as "Read mail", "Send mail", "Chat", "View calendar", and "Look up name". A top-level menu page could include various other such lists and items could be presented differently; for example, in a variation on the illustrated implementation, the lines of the top-level menu page include the following descriptions: "Read mail", "Send mail", "Chat", "View calendar", "Look up name", and "Log out", which can be selected to log out directly, and the items are presented without numbers before them.

In the illustrated implementation, client machine 220 also presents a ">" symbol as a cursor to indicate the current selection, with the first item in the list being the default current selection. The user can then change the current selection by requesting scrolling to move the ">" symbol up or down until it is positioned to the left of a desired operation. When a desired operation is selected, the user can press a button adjacent the "Go!" label to request that the client machine 220 transmit a request for the desired operation to the IMS.

The term "scroll", as used herein, thus refers to two related operations that can be implemented together or separately. One operation scrolls by moving a display image with respect to a virtual workspace such as a page; an example is upward or downward scrolling as illustrated by display images 280 and 282. Another operation scrolls by moving a cursor that indicates current selection from one selectable item to another; an example is movement of the ">" symbol from one item in a menu to another, as shown in display images 280 and 282. Scrolling can generally be implemented using up-down keys or pads or using next-previous buttons or buttons adjacent next-previous labels. In response to an up or down signal, client machine 220 can move the cursor to the next selectable item in the indicated direction unless the cursor is not currently in the display image, in which case client machine 220 can advance the display image position by one line in the indicated direction.

The top-level menu page is thus the starting point for all IMS capabilities. The manner in which the IMS responds to requests for operations from the top-level menu in a current implementation is described below.

Top-Level Intermediary Server Operations

The five operations on the menu illustrated by display images 280 and 282 have been implemented as follows in a current implementation.

Read Mail

In the current implementation, the top-level menu always includes the "Read mail" operation.

Figure 6:
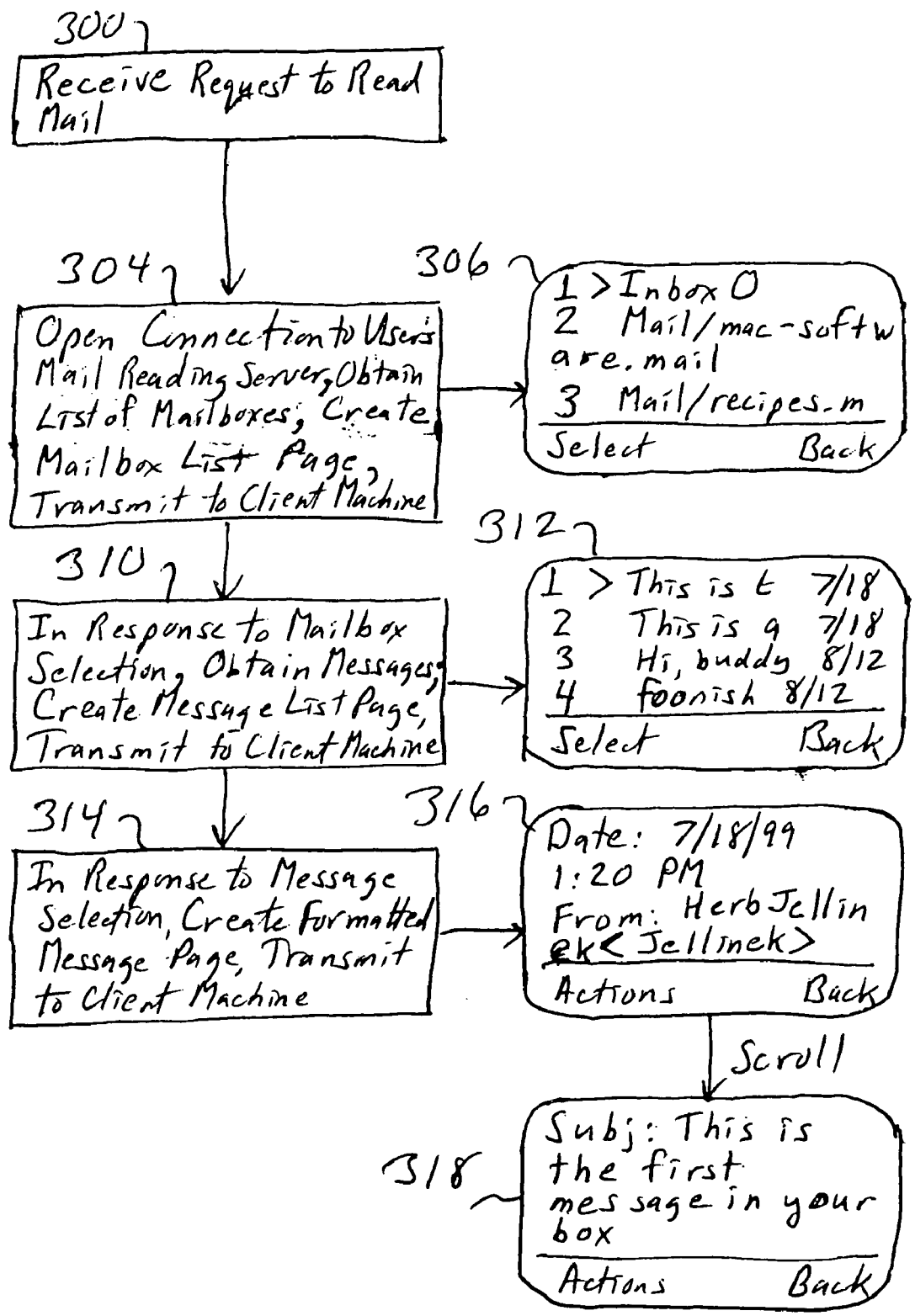
FIG. 6 is a flow chart showing operations of the IMS of FIG. 4 in response to a request to read mail.

FIG. 6 illustrates acts performed by the IMS in response to a request for the "Read mail" operation. In general, each act performed by the IMS involves the execution of one or more servlets.

In box 300, the IMS receives the request for the "Read mail" operation from client machine 220.

In response to the request received in box 300, the IMS opens a secure connection to user's network 202 using Transport Layer Security (TLS) such as a Secure Socket Layer (SSL) 3.0-based tunnel. Many conventional IMAP4 and other servers are able to maintain such a tunnel, or appropriate software could be loaded and run on user's server system 212 to maintain such a tunnel. Once the tunnel is established, the IMS has a secure connection across communication network 200 to user's server subsystem 212.

In order to perform the "Read mail" operation, the IMS opens a connection to the user's mail reading server, an IMAP4 server in the current implementation, in box 304. The IMS also obtains from the user's mail reading server a list of the user's mailboxes, and uses the list to create a WML mailbox list page. The IMS then transmits the mailbox list page to client machine 220.

Display image 306 is an example of how a mailbox list page appears when presented. As illustrated, client machine 220 presents the mailbox list page as a list of numbered items, each item including a mailbox name such as "Inbox", which is where new messages arrive; "Mail/mac-software-.mail"; and "Mail/recipes.mail". As in box 280 in FIG. 5, client machine 220 also presents a ">" symbol as a cursor to indicate the current selection, with the first item in the list being the default current selection; in the illustrated example, the last mailbox name is truncated due to screen size, but when the user selects it by moving the cursor to it, the mailbox name can scroll horizontally to provide a full display of "Mail/recipes.mail". Client machine 220 also presents a number after the Inbox, indicating the number of new messages that have not yet been viewed, referred to as "unseen" new messages". In image 306, the Inbox has zero unseen new messages. When a desired mailbox is the current selection, the user can press a button adjacent the "Select" label to request that the client machine 220 transmit a request to view the messages in the selected mailbox to the IMS.

In box 310, the IMS responds to user selection of a mailbox by again connecting to the user's mail reading server to obtain the messages in the mailbox from the user's mail server. The IMS uses the messages to create a WML message list page, which it transmits to client machine 220.

A message list page could have any appropriate format. Display image 312 is an example of a message list page that is presented by client machine 220 as a list of numbered items, each item including a message's subject line, truncated if necessary, and the date of the message, or, if today's date, the message's time of creation. Alternatively, a message list page could be presented as a list in which the subject line is replaced, for example, by the message's "From" line. The user could choose the format of message list pages in advance through an appropriate user interface within user's network 202. As above, client machine 220 also presents a ">" symbol as a cursor to indicate the current selection, with the first item in the list being the default current selection. When a desired message is the current selection, the user can press a button adjacent the "Select" label to request that the client machine 220 transmit a request to view the selected message to the IMS.

In box 314, the IMS responds to user selection of a message by using the selected message to create a WML formatted message page, which it transmits to client machine 220.

A formatted message page could similarly have any appropriate format, although it is typically useful to create a concisely reformatted version that is optimized for the display constraints of client machine 220, such as a small screen. For example, as shown by display image 316, client machine 220 can present a first part of a formatted message page showing the beginning of a reformatted version of the message. If the device's display is not large enough to display all of the reformatted version, when the user requests scrolling, such as by pressing a scroll button, client machine 220 can present a second part of the formatted message page with a subsequent part of the list of operations, as shown by display image 318. Display images 316 and 318 illustrate a reformatted version that includes a list of items, each beginning with a subject such as "Date:", "From:", "Subj:", and so forth. The message's header lines can either be reformatted or suppressed altogether to better fit the screen and to minimize transmission time.

Send Mail

Figure 7:
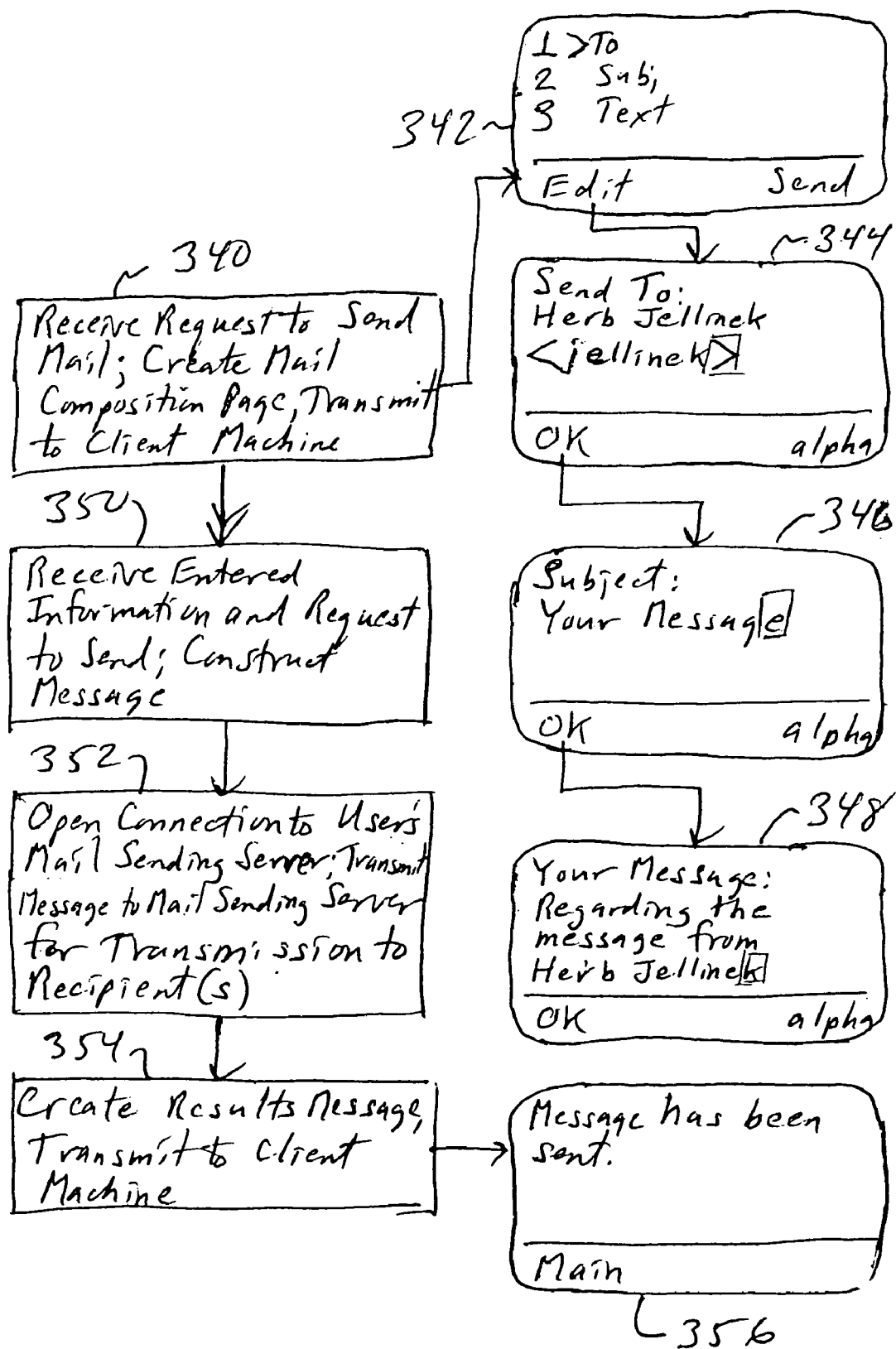
FIG. 7 is a flow chart showing operations of the IMS of FIG. 4 in response to a request to send mail.

In the current implementation, the top-level menu always includes the "Send mail" operation. FIG. 7 illustrates acts performed by the IMS in response to a request for the "Send mail" operation. As above, each act performed by the IMS involves the execution of one or more servlets.

In box 340, the IMS receives the request for the "Send mail" operation from client machine 220. In response, the IMS creates a mail composition page and transmits it to client machine 220.

An example of a mail composition page in response to a "Send mail" request is shown by display images 342, 344, 346, and 348. A first part of the page, shown in image 342, provides a list of numbered items, each item including a brief description of a message field that can be edited. As above, client machine 220 also presents a ">" symbol as a cursor to indicate the current selection, with the first item in the list being the default current selection. When a desired message field is the current selection, the user can press a button adjacent the "Edit" label to request that client machine 220 present another part of the mail composition page so that the user can edit the selected message field. When the user completes editing, the user can press a button adjacent the "Send" label to request that client machine 220 send the edited message fields and a request to send the message to the IMS.

A second part of the page, shown in image 344, is presented when the user presses the "Edit" button when the "To" message field is selected. Image 344 elicits the address to which a message is to be sent; in the example, the user has entered "Herb Jellinek <Jellinek>" or this address has been included in the page by default, allowing the user to change it. When the user indicates the address is complete by pressing a button adjacent the "OK" label, client machine returns to the first part of the page, as shown in image 342, and the user can then scroll the cursor to select another message field.

A third part of the page, shown in image 346, is presented when the user presses the "Edit" button when the "Subj" message field is selected. Image 346 elicits the subject of the message; in the example, the user has entered "Your Message". When the user indicates the subject is complete by pressing a button adjacent the "OK" label, client machine returns to the previously shown part of the page, similar to the part shown in image 342, and the user can then scroll the cursor to select another message field.

A fourth part of the page, shown in image 348, is presented when the user presses the "Edit" button when the "Text" message field is selected. Image 348 elicits the body of the message; in the example, the user has entered "Regarding the message from Herb Jellinek". When the user indicates the text is complete by pressing a button adjacent the "OK" label, client machine returns to the previously shown part of the page, similar to the part shown in image 342, and the user can then scroll the cursor to select another message field.

When the user has completed all the fields as desired, the user can press a button adjacent the "Send" label to request that a message be sent in accordance with the entered information.

In box 350, the IMS receives the entered information and the request to send from box 340. In response, the IMS constructs a message in accordance with the entered information and in the correct format to be sent.

The IMS opens a secure connection to user's server subsystem 212, as described above. In order to perform the "Send mail" operation, the IMS opens a connection to the user's mail sending server, an SMTP server in the current implementation, in box 352. The IMS then transmits the message to the user's mail sending server for transmission to the recipient(s).

Although the IMS could use an SMTP server in provider's server system 232 to transmit the message, this could be problematic because addresses local to user's network 202 would not be accessible.

Based on the result of the transmission, IMS then creates a results page and transmits it to client machine 220, in box 354. Display image 356 illustrates an example of a results page indicating that a message has been successfully sent. Other results pages could detail problems that occurred in delivering a message.

Chat

In the current implementation, the top-level menu could include the "Chat" operation. This operation is useful when one has immediate communication needs that e-mail or a voice telephone call cannot fulfill. For example, if one needs to consult a group of people or any single member of a group, interactive text chat may be a better solution.

To enable the IMS to provide the "Chat" service to a group of people, a counterpart chat server program must be running on User's Server System 212 or another network accessible to all of the people in the group. Similarly, to enable users of other computers to participate, their computers must be running a counterpart chat client program, which can, for example, provide a graphical user interface. The chat server and chat client programs can be implemented with conventional techniques, such as those used to implement commercially available chat software. The initial implementation uses conventionally implemented chat server and chat client programs that could be replaced by Yahoo! Messenger or AOL Instant Messenger with minimal change to the rest of the system.

Figure 8:
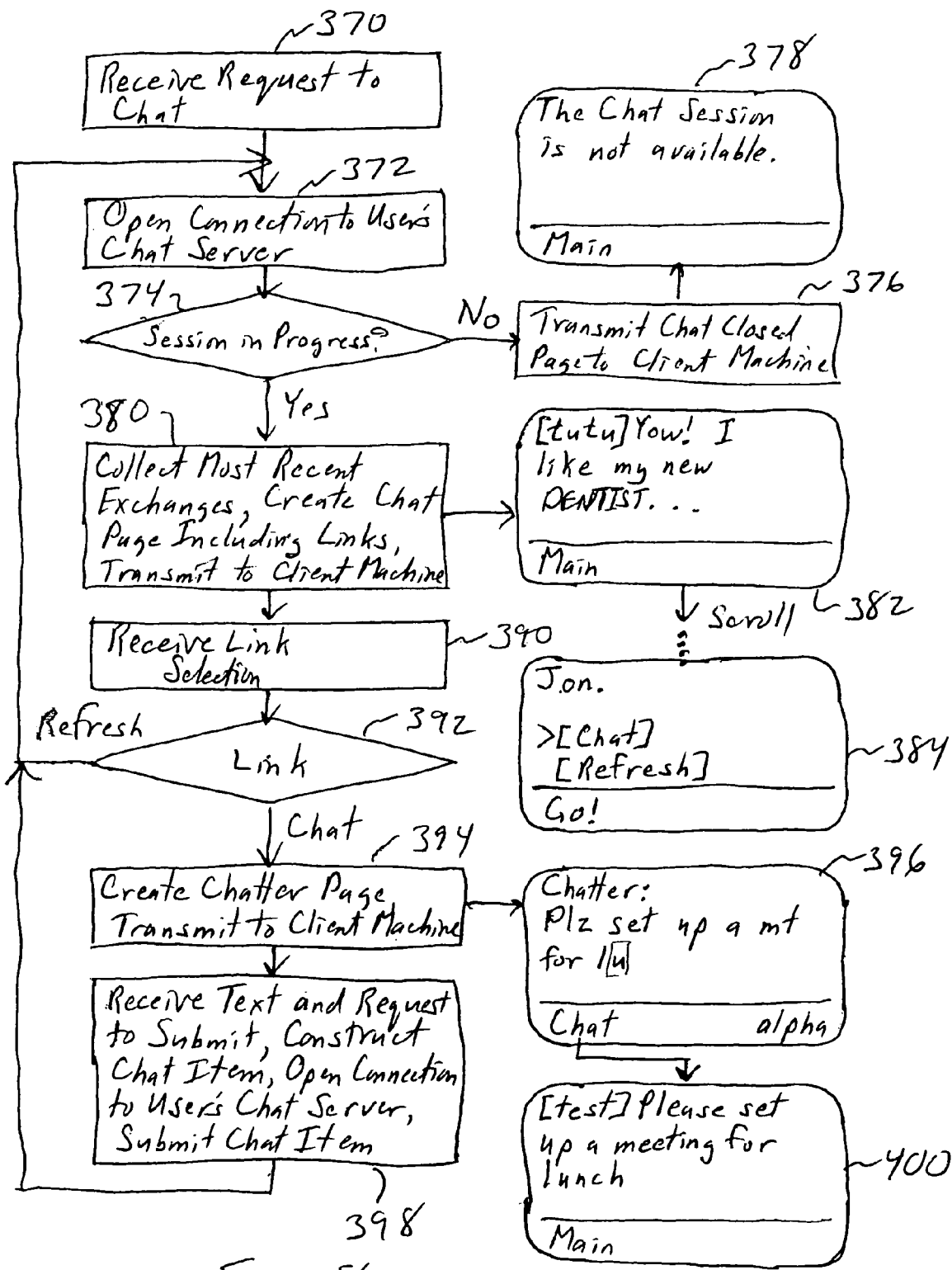
FIG. 8 is a flow chart showing operations of the IMS of FIG. 4 in response to a request to chat.

FIG. 8 illustrates acts performed by the IMS in response to a request for the "Chat" operation. As above, each act performed by the IMS involves the execution of one or more servlets. FIG. 8 also suggests acts performed by client machine 220, running a counterpart WAP client that supports the "Chat" service.

In box 370, the IMS receives the request for the "Chat" operation from client machine 220.

In response, the IMS opens a secure connection to user's server subsystem 212, as described above. In order to perform the "Chat" operation, the IMS opens a connection to the user's chat server, in box 372. Identifying information for a user's chat server can be stored in advance as part of the user's IMS profile. The IMS determines in box 374 whether a chat session is in progress and, if not, transmits a chat closed page to client machine 220 in box 376. Display image 378 illustrates an example of a chat closed page.

If a chat session is in progress, the IMS collects the most recent exchanges from the chat server, in box 380. Using the collected exchanges, the IMS creates a chat page, including links allowing a user to add some "chatter" to the conversation or view the latest chat. The link to view the latest chat is necessary because the "Chat" operation is not automatically updating, due to limitations in the current WAP standard—there is no way in WAP 1.1 to notify interested parties when the page they are viewing has been updated. The IMS transmits the chat page with included links to client machine 220.

An example of a chat page in response to a "Chat" request is shown by display images 382 and 384. A first part of the page, shown in image 382, shows an item of "chatter" that was collected in box 380. By scrolling, the user can reach a closing part of the page, shown in image 384, which shows the end of the final item of "chatter", followed by a list of links. The list includes a "Chat" link enabling the user to add "chatter" to the conversation and a "Refresh" link enabling the user to view an updated chat page. As above, client machine 220 also presents a ">" symbol as a cursor to indicate the current selection within the list, with the first link in the list being the default current selection. When a desired link is the current selection, the user can press a button adjacent the "Go!" label to request that the client machine 220 transmit a request to the IMS to follow the desired link.

In box 390, the IMS receives a request to follow a selected link, and in box 392, the IMS branches based on the link selected. If the "Refresh" link was selected, the IMS returns to box 372, reestablishing connection to the chat server. But if the "Chat" link was selected, the IMS creates a chatter page and transmits it to client machine 220, in box 394. Display image 396 illustrates an example of a chatter page, in which the user has entered a shorthand version of the text "Please set up a meeting for lunch". If the user then presses a button adjacent the "Chat" label, client machine 220 transmits to the IMS a request to submit the expanded version of the entered text to the conversation.

In response to the request and the shorthand version of the text, the IMS expands the text and constructs a chat item using the text, in box 398. The IMS then contacts the user's chat server as in box 372 and submits the chat item. The IMS can then return to the test in box 374 and, if the chat item was successfully submitted, the chat page created in the next iteration of box 380 should include the submitted chat item, as illustrated by display image 400. The chat page shown in image 400 shows the user's "chat handle", a nickname which is "test" in the example, followed by the expanded version of the shorthand text from image 396.

View Calendar

In the current implementation, the top-level menu always includes the "View calendar" operation. It is increasingly common for users to keep their personal schedules on a network server to make it easy for others to schedule appointments with them. Although there is not yet an Internet standard for networked calendars, conventional networked calendars implement the following simple functions: (i) Schedule a new appointment, given a date, start time, end time, and meeting description; (ii) delete an appointment, given a unique identifier such as an appointment number for the appointment; and (iii) list all appointments on a given day, and return a unique identifier such as an appointment number for each appointment. In the current implementation, the IMS provides a calendar service that includes these three functions.

Figure 9:
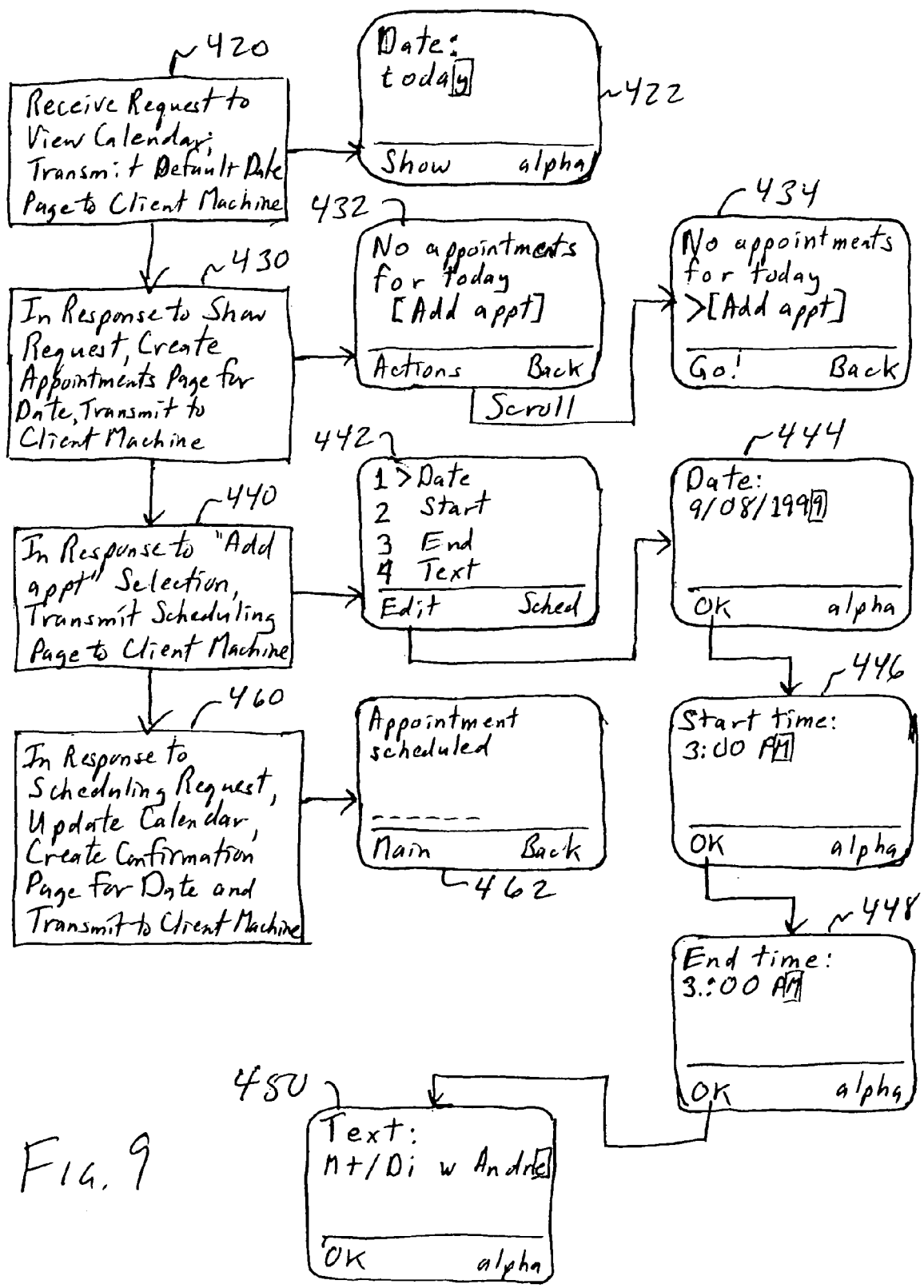
FIG. 9 is a flow chart showing operations of the IMS of FIG. 4 in response to a request to view calendar.

FIG. 9 illustrates acts performed by the IMS in response to a request for the "View calendar" operation. As above, each act performed by the IMS involves the execution of one or more servlets.

In box 420, the IMS receives the request for the "View calendar" operation from client machine 220. In response, the IMS transmits a default date page to client machine 220, requesting that the user indicate the desired calendar date and already completed with a default date that the user can enter by a single button push. Display image 422 illustrates an example of a default date page in which the default date is "today". The user can edit the default date page to include another date. When the desired date is on the default date page, the user can press a button adjacent the "Show" label to request that client machine 220 transmit a request to the IMS to show a list of appointments for the desired date.

In response to a request to show a list of appointments for a date, the IMS creates an appointments page for the date and transmits the appointments page to client machine 220. Display images 432 and 434 show an example of an appointments page. A first version of the page, shown in image 432, indicates that no appointments have been scheduled for today and includes a link labeled "Add appt" which can be followed to add an appointment. In a second version of the page, shown in image 434, the user has scrolled to position a ">" symbol as a cursor to indicate selection of the link labeled "Add appt". The user can press a button adjacent the "Go!" label to request that the client machine 220 transmit a request to the IMS to follow the selected link.

In box 440, the IMS responds to the request to follow the selected link by transmitting a scheduling page to client machine 220. Display image 442 illustrates an example of a first subpage of a scheduling page. The first subpage is presented by client machine 220 as a list of numbered items, each item including a short description of an item of information relating to an appointment. As above, client machine 220 also presents a ">" symbol as a cursor to indicate the current selection, with the first item in the list being the default current selection. When a desired item is the current selection, the user can press a button adjacent the "Edit" label to request an opportunity to edit the item.

Display images 444, 446, 448, and 450 illustrate a sequence of subpages of the scheduling page. Display image 444 shows a subpage in which the user has edited the "Date" item, entering the value "9/08/1999". The user may then press a button adjacent the "OK" label to return to the first subpage and select another item.

Display image 446 shows a subpage in which the user has edited the "Start time" item, entering the value "3:00 PM". As above, the user may again press a button adjacent the "OK" label to return to the first subpage and select another item.

Display image 448 shows a subpage in which the user has edited the "End time" item, entering the value "3:00 PM". As above, the user may again press a button adjacent the "OK" label to return to the first subpage and select another item.

Display image 450 shows a subpage in which the user has edited the "Text" item, entering a shorthand version of the text "Meeting/dinner with Andre". As above, the user may again press a button adjacent the "OK" label to return to the first subpage and select another item.

When the user wishes to schedule an appointment, the user may press a button adjacent the "Sched" label in the first subpage. In response, client machine 220 transmits a request to the IMS to schedule an appointment according to the information entered in the scheduling page.

In response to the request, the IMS updates the calendar in accordance with the information entered in the scheduling page, in box 460. In updating the calendar, the IMS can expand the shorthand version of the text. The IMS also creates a confirmation page that can include an updated list of appointments for the selected date, and transmits the confirmation page to client machine 220.

Display image 462 illustrates a confirmation page which does not include an updated list of appointments. As in the other examples above, the user can press a button adjacent the "Main" label to return to the top-level menu.

Look Up Name

In the current implementation, the top-level menu always includes the "Look up name" operation. Users typically have one or more databases of information about other users, which may be referred to as address books, contact lists, or personal directories. As used herein, the term "address book" includes all of these types of databases.

A user will find it advantageous to keep a single copy of the user's address book on the user's network server, rather than incurring the extra work necessary to keep several versions that must be synchronized to make it easy for others to schedule appointments with them. The IMS makes it easy to keep a single address book by including the ability to interact with LDAP servers, which are designed to serve address book information to any client that speaks the LDAP protocol. Programs that speak the LDAP protocol include Netscape Messenger and Microsoft Outlook Express.

Figure 10:
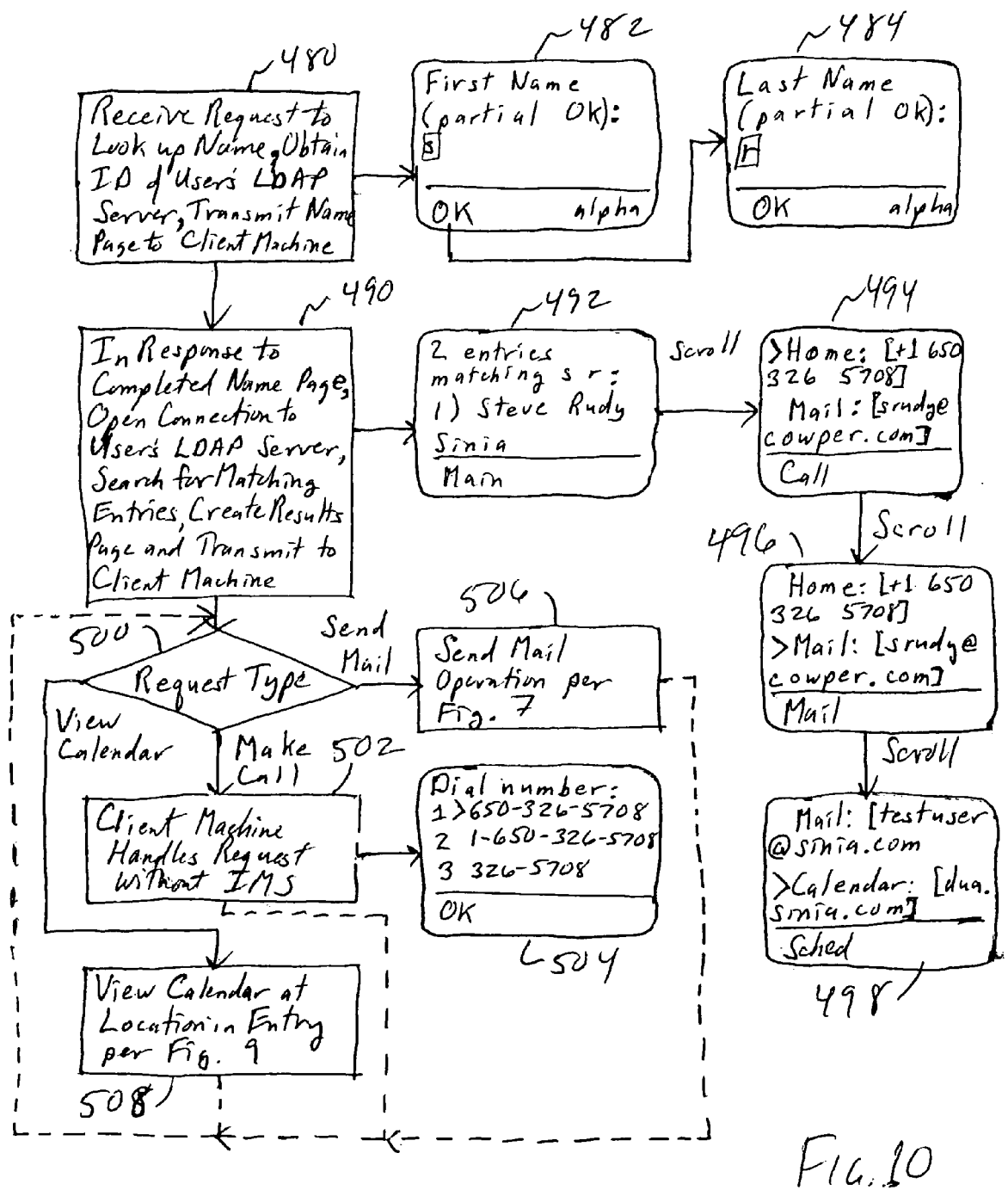
FIG. 10 is a flow chart showing operations of the IMS of FIG. 4 in response to a request to look up name.

FIG. 10 illustrates acts performed by the IMS in response to a request for the "Look up name" operation. As above, each act performed by the IMS involves the execution of one or more servlets.

In box 480, the IMS receives the request for the "Look up name" operation from client machine 220. In response, the IMS accesses previously stored information in memory 234 about the user to obtain an identifier (ID) of the user's preferred LDAP server and other parameters; the user could have loaded the previously stored information into memory 234 through a user interface provided by the IMS through user's server system 212. In addition, the IMS transmits a name page to client machine 220, allowing the user to enter a complete or partial desired name for searching the user's address book database.

Display images 482 and 484 illustrate an example of a name page in which the user has entered a partial first name (or given name) string and a partial last name (or surname) string. A first part of the name page, shown in display image 482, is headed "First Name (partial OK)", and the user has entered a first name string that includes only the character "s" in the example. The user can press a button adjacent the "OK" label in the first part of the name page to complete entry of the first name string and obtain a second part of the name page, shown in display image 484. The second part is headed "Last Name (partial OK)", and the user has entered a last name string that includes only the character "r" in the example. The user can press a button adjacent the "OK" label in the second part of the name page to complete entry of the last name string and to request that client machine 220 transmit a request to the IMS to search the user's address book database with the entered strings.

In response to a request to search the user's address book database with first and last name strings, the IMS opens a connection to the user's LDAP server and searches for entries with names that satisfy a matching criterion when compared with the entered strings, in box 490. The IMS creates a results page based on the results of the search and transmits the results page to client machine 220. In the current implementation, address book entries can include a person's name, a company name, a postal address, one or more e-mail addresses, a home telephone number, an office telephone number, a fax number, a pager number, a calendar location, a preferred chat session, and a server identifier. The IMS can use some of these items of information to create the results page, as described below, and can ignore other items.

The following two-part matching criterion has been successfully implemented in the IMS: Under a string input subcriterion, if the user enters strings that include no characters for both names, a result is returned indicating that no entries in the database match, because this is likely to be an input error. Otherwise a substring match subcriterion applies, so that an entry matches only if both its first name includes a substring that matches the entered first name string, disregarding case, and also its last name includes a substring that matches the entered last name string, again disregarding case. In the illustrated example, this matching criterion would be satisfied by all entries with "s" in the first name and "r" in the last name. If the user enters a string that includes no characters, i.e. an empty string, for one (but not both) of the names, then every entry would include a matching substring for that name, i.e. the empty substring.

Display images 492, 494, 496, and 498 show an example of a results page.

A first part of the results page, shown in image 492, indicates that the database includes two entries that match the entered strings, "s" and "r". The first part of the results page also shows the beginning of a list of the matching entries, in which each entry begins with a number and identifying information the IMS has extracted from the entry. In the illustrated example, the first entry's identifying information includes the person's name, "Steve Rudy", and the company name, "Sinia". Following the identifying information is a series of items from which the user can select to request actions.

Second and third parts of the results page, shown respectively in display images 494 and 496, can be reached by scrolling downward from the first part to position a ">" symbol as a cursor to indicate selection of one of two links labeled "Home" and "Mail". The link labeled "Home" includes the home telephone number from the entry, and the link labeled "Mail" includes one of the e-mail addresses from the entry. If the cursor indicates selection of the link labeled "Home", a "Call" label is also presented and the user can press a button adjacent the "Call" label to request that the client machine 220 request the standard WAP "make call" function. If the cursor indicates selection of the link labeled "Mail", a second "Mail" label is presented and the user can press a button adjacent the second "Mail" label to request a "Send mail" operation as described above in relation to FIG. 7 for the e-mail address in the link. As mentioned in relation to FIG. 7, image 344 would include an e-mail address by default, in this case the selected e-mail address from the results page.

A fourth part of the results page, shown in display image 498, can be reached by scrolling downward from the second or third part and by then positioning the cursor to indicate selection of a link labeled "Calendar". With this selection, a "Sched" label is also presented and the user can press a button adjacent the "Sched" label to request the "View calendar" operation described above in relation to FIG. 9, but accessing the calendar at the location from the entry rather than the user's own calendar.

While the results page is being presented, the IMS thus branches based on the type of request the user makes, in box 500. Some types of requests are illustrated in FIG. 10, though others could also be available.

If the user requests a "make call" function, client machine 220 handles the request without the IMS, in box 502. Display image 504 illustrates a make call page that client machine 220 could store at an appropriate location such as wtai://wp/mc and could present in response to the user's request; as shown, image 504 includes a list of dialing options from which the user can select by positioning a cursor. Then, the user can press a button adjacent an "OK" label to request that client machine 220 place a call using the selected dialing option through carrier's network 204. While client machine 220 has control of the make call operation, it could terminate connection to the IMS, and the IMS could wait for reconnection by client machine 220, while saving the user's current state in the IMS user interface. For example, a phone browser running on client machine 220 could reconnect to the IMS automatically upon hang up or could again present the results page as in image 492, allowing the user to press a button adjacent the "Main" label to initiate reconnection.

If the user requests a "Send mail" operation or a "View calendar" operation, the IMS provides the requested operation, in box 506 or box 508, respectively.

When the response to each request is completed, client machine 220 can again display the results page, either immediately or after another log in operation, so that the user can make another request, as suggested by the dashed lines from boxes 502, 506, and 508 back to box 500. For example, the user could begin by requesting a "make call" function to the home telephone number in display image 494; after placing the telephone call, the user could return to display image 496 and request a "Send mail" operation to the e-mail address in the entry, or, alternatively, the user could return to display image 498 and request a "View calendar" operation accessing the calendar at the location in the entry.

Automatically Expanding Abbreviated Substrings

The general features described above could be implemented in many ways within the context of the top-level IMS operations described above. In an initial implementation, the general features are implemented as an extension of the "Send mail", "Chat", and "View calendar" operations described above.

Figure 11:
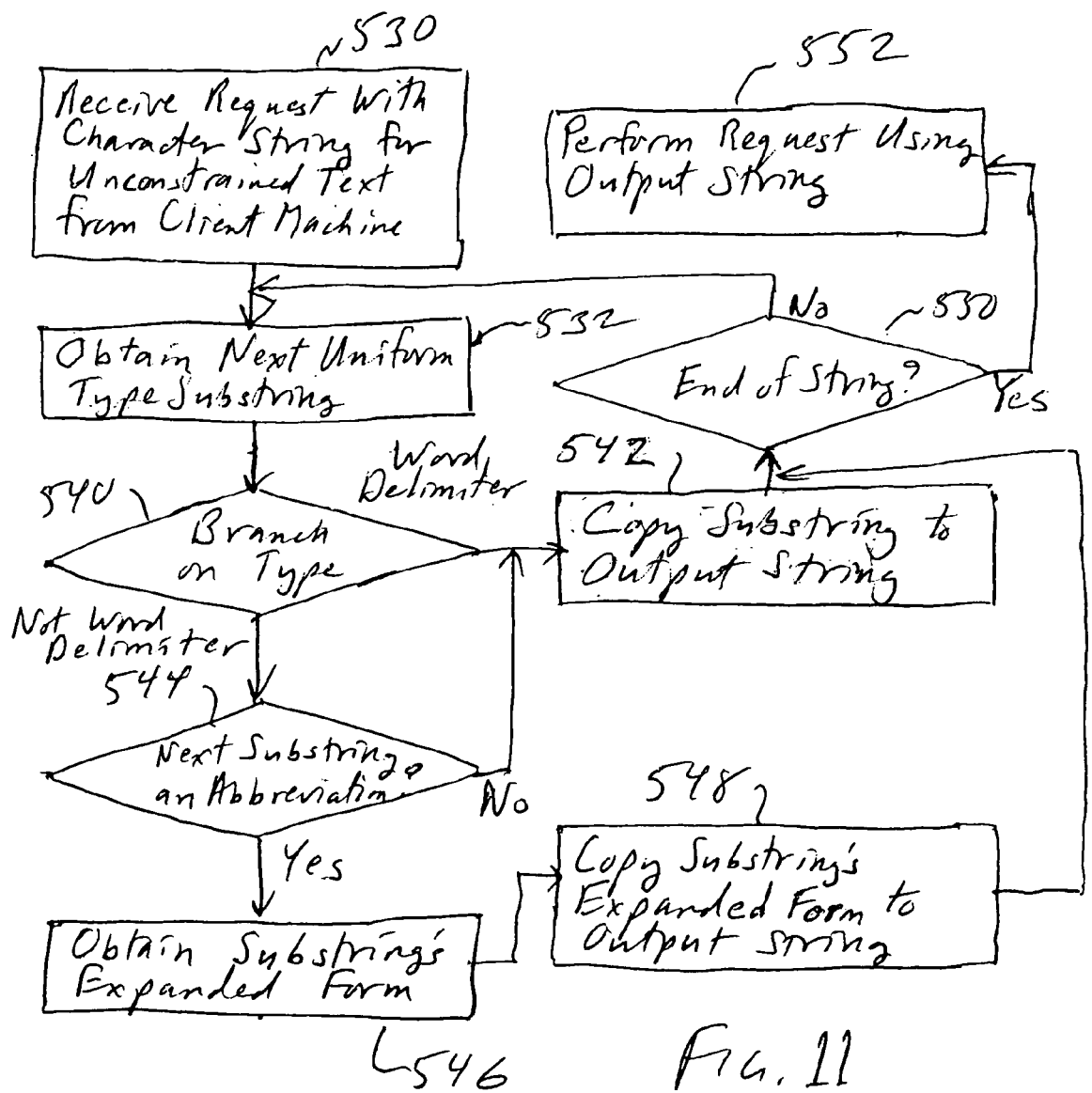
FIG. 11 is a flow chart showing operations of the IMS of FIG. 4 in automatically expanding abbreviated substrings.
Figure 12:
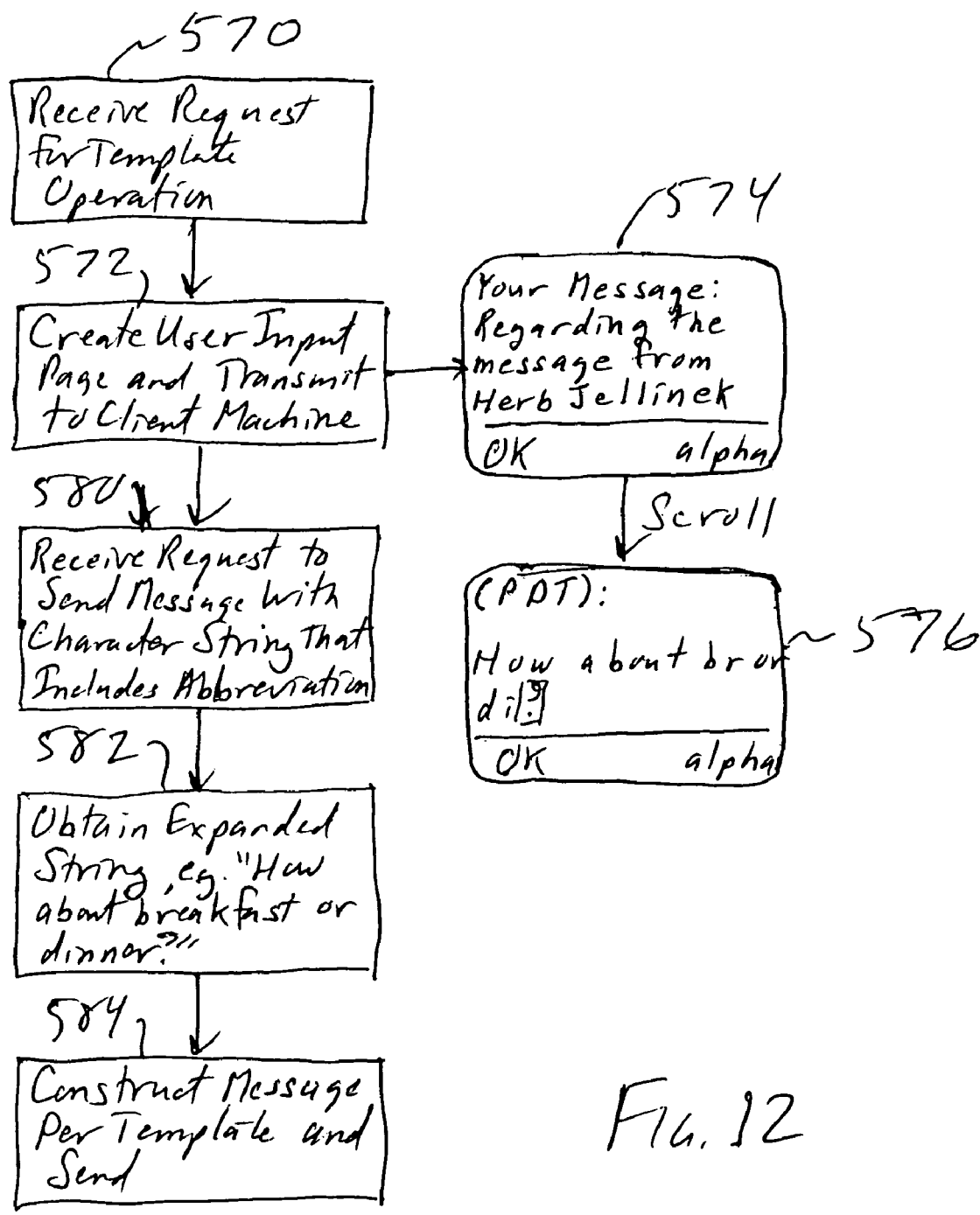
FIG. 12 is a flow chart showing operations of the IMS in response to a request for a template operation, using the operations of FIG. 11 to obtain an expanded string.

FIG. 11 illustrates how the "Send mail" operation shown in FIG. 7, the "Chat" operation shown in FIG. 8, the "View calendar" operation shown in FIG. 9, and other similar operations can be extended to automatically expand abbreviated substrings. For example, the acts in FIG. 11 can be automatically performed in box 350 in FIG. 7, in box 398 in FIG. 8, and in box 460 in FIG. 9. FIG. 12 illustrates an additional example of automatic expansion of substrings that relates to templates.

In box 530 in FIG. 11, the IMS receives a request for an operation, and the request includes a character string that was entered by a user of client machine 220 and that is not constrained to be identically reproduced, referred to in FIG.

11 as "unconstrained text". Examples of unconstrained text include a subject per image 346 in FIG. 7, a message per image 348 in FIG. 7, as chatter per image 396 in FIG. 8, and text for an appointment per image 450 in FIG. 9; additional examples could include the subject or location for an appointment. If the character string includes an abbreviated substring preceded and followed by word delimiters, the act in box 530 implements the general act in box 100 in FIG. 2.

Examples of character strings that must be identically reproduced include user names and IDs, passwords, PINs, e-mail addresses, and so forth. In addition, some character strings may be unconstrained text or not, depending on the implementation, such as dates, times and strings for searching.

The act in box 532 begins each of a series of iterations by obtaining the next uniform type substring of the character string, where each character in the string has a type that is either word delimiter character or not. The act in box 532 has been successfully implemented by treating all non-alphanumeric characters as word delimiter characters.

In box 540, the IMS branches based on the type of the substring from box 532. If the type is word delimiter, the IMS copies the substring to an output string, in box 542. Or if the type is not word delimiter, but the IMS determines in box 544 that the substring is not an abbreviation, such as by comparing the substring with a list of abbreviations, the IMS similarly copies the substring to the output string, in box 542. But if the substring is an abbreviation, the IMS obtains the expanded form of the substring in box 546, and then copies the expanded form to the output string, in box 548.

The IMS can obtain an abbreviation's expanded form in any of several ways. Some abbreviations can expand into complete words having the same capitalization as the abbreviation, as illustrated by the expanded text in image 400 in FIG. 8. For example, "How about br or di?" could expand to "How about breakfast or dinner?"; "Br w Andrea" could expand to "Breakfast with Andrea"; and "Let's hv lu" could expand to "Let's have lunch". A user can edit a personalized set of abbreviations and expanded forms using an appropriate user interface such as a web page provided by the IMS through user's server system 212. Or a standard set of abbreviations and expanded forms could be provided for all users by the IMS.

Other abbreviations can expand into results that are calculated at expansion time by processes referred to herein as "macros". For example, "ds" can expand to the current date, such as "9/11/1999"; "dts" can expand to the current time and date, such as "10:55:31 9/11/99"; and "ts" can expand into the current time, such as "10:55:31". The set of macros can be changed or expanded on an IMS-wide basis by adding String methods to a specially designated Java class.

Such time-dependent macros have been successfully implemented by producing an intermediate version of the output string in which abbreviations for macros are expanded to method names that begin with a special symbol such as "$"; "ds" could be expanded to "$DateStamp", "dts" to "$DateTimeStamp", and "ts" to "$TimeStamp". Then, a final version of the output string can later be obtained by going through the output string and performing the appropriate method to again expand each substring that begins with the special symbol.

The series of iterations continues until the end of the string is reached, as determined in box 550. When the end of the string is reached, the IMS has produced an output string that is an expanded version of the input string with each abbreviation replaced by its expanded form. In box 552, the IMS can use the expanded string as appropriate in performing the request received in box 530.

A series of iterations, each including the acts in boxes 532, 540, 542, 544, and 548, thus implements the general act in box 102 in FIG. 2.

FIG. 12 illustrates an additional example relating to templates. In the act in box 570, the IMS receives a request for a template-related operation, such as to reply to a message or to forward a message. In response, in box 572, the IMS creates an appropriate user input page to obtain items of information that it must obtain from the user in accordance with the relevant template object. The IMS then transmits the user input page to client machine 220.

Display images 574 and 576 show first and second subparts of an example of a user input page that includes the body of a previous message and a place for the user to provide additional text. The previous message could read, in its entirety, "Regarding the message from Herb Jellinek <jellinek> on Sun, 18 Jul. 1999 13:20:13-0700 (PDT)". As shown in image 576, the user can provide the character string "How about br or di?" as input.

In box 580, the IMS receives a request to send a message, including a character string with an abbreviation, such as "br" or "di" in the example in image 576, so that box 580 is an example of the act in box 530 in FIG. 11. In box 582, the IMS can perform the other acts in FIG. 11 to obtain an expanded string, such as "How about breakfast or dinner?" for the example in image 576. Then, in box 584, the IMS can construct a message using the expanded string in accordance with the template object and can send the message as in boxes 352 and 354 in FIG. 7.

Because the expansion is performed at the IMS rather than at the client, the technique may be used with clients that have relatively limited on-board resources, such as mobile phones and PDAs. According to one embodiment, the expanded substring is not transmitted back to the client. Such an embodiment is particularly useful for situations in which the bandwidth between the client and the IMS is relatively narrow. The user gains the benefit of the expansion without incurring the delay of receiving the expanded output at the client.

The implementations described above could be varied in many ways within the scope of the invention. An implementation similar to the above description has been successfully executed on server machines with several operating system/CPU architecture combinations, including Microsoft Windows NT 4.0/Intel x86, Sun Solaris 7/Intel x86, Sun Solaris 7/Sun UltraSPARC, and by running atop an Apache 1.3 Web server, but implementations could be executed on any other appropriate server machines, and the services described could be provided by one or more computers.

An implementation similar to the above description has been successfully executed by running a custom set of servlets compiled from Java programming language source code, but implementations could run code of any other appropriate type and compiled from any other appropriate source, such as from other programming languages and environments, including non-object-oriented environments.

An implementation similar to the above description has been successfully executed with client machines that are wireless telephones such as Motorola P7389 or a Nokia 7110 telephones, each executing Phone.com's UP Browser 3.1 or UP Browser 4.0. Experiments have also shown that a client machine could be a Palm Pilot V or other PDA, by successfully downloading AUSystem's WAP browser to a Palm Pilot V, connecting to a server, logging in, and sending e-mail. Implementations could, however, use any other appropriate client machine executing any other Wireless Markup Language (WML) browser or other software by which information can be presented to a user. For example, client machines could include remote or mobile devices such as cellular telephones, pagers, landline display screen telephones, set-top boxes, general purpose computers, and so forth.

An implementation similar to the above description has been successfully executed using the Internet to provide a communication network and using the WAP protocols, including WML 1.0 and WML 1.1, to present information to and receive information from client machines, but various other communication networks and protocols could be used. For example, instead of the Internet, a private intranet such as leased lines could provide a communication network between provider's network and carrier's network on the one hand and between provider's network and user's network on the other. Or a virtual private network (VPN) could be used as mentioned above, with secure encryption and decryption to create a sort of subnetwork on the Internet.

The implementations described above permit a user to access information stored by the user in a server on the user's network, but a user could access information stored by others and could also access information stored on other networks, whether in a corporate or personal server.

The implementations described above provide a user interface with a specific set of top-level operations implemented in specific ways and with various other operations available in response to selections made by pushing buttons adjacent labels, but various other user interfaces could be provided, with or without top-level operations, with various other sets of top-level operations and other available operations, with the same or similar operations but implemented differently, with different labels adjacent push buttons, or with selection techniques other than pushing buttons.

The implementations described above receive specific types of requests from a client machine with character strings that include specific abbreviations preceded and followed by specific word delimiters, including messages, chatter, and text for appointments, but any appropriate type of request could include a character string with an abbreviation, and various other abbreviations could be included, preceded and followed by various other types of word delimiters.

The implementations described above respond automatically finding abbreviations in specific ways and by producing expanded strings in specific ways, but abbreviations preceded and followed by word delimiters could be found in various other ways and expanded strings in which an abbreviation is replaced by its expanded form could be produced in various other ways.

Also, in the implementation described above, certain software components are mentioned, but the invention could be implemented with other combinations of hardware and software and with software organized in any appropriate way.

The invention has been applied in a context in which requests including character strings with abbreviations are received from wireless telephones, but the invention could be applied in various other contexts.

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

Hardware Overview

Figure 13:
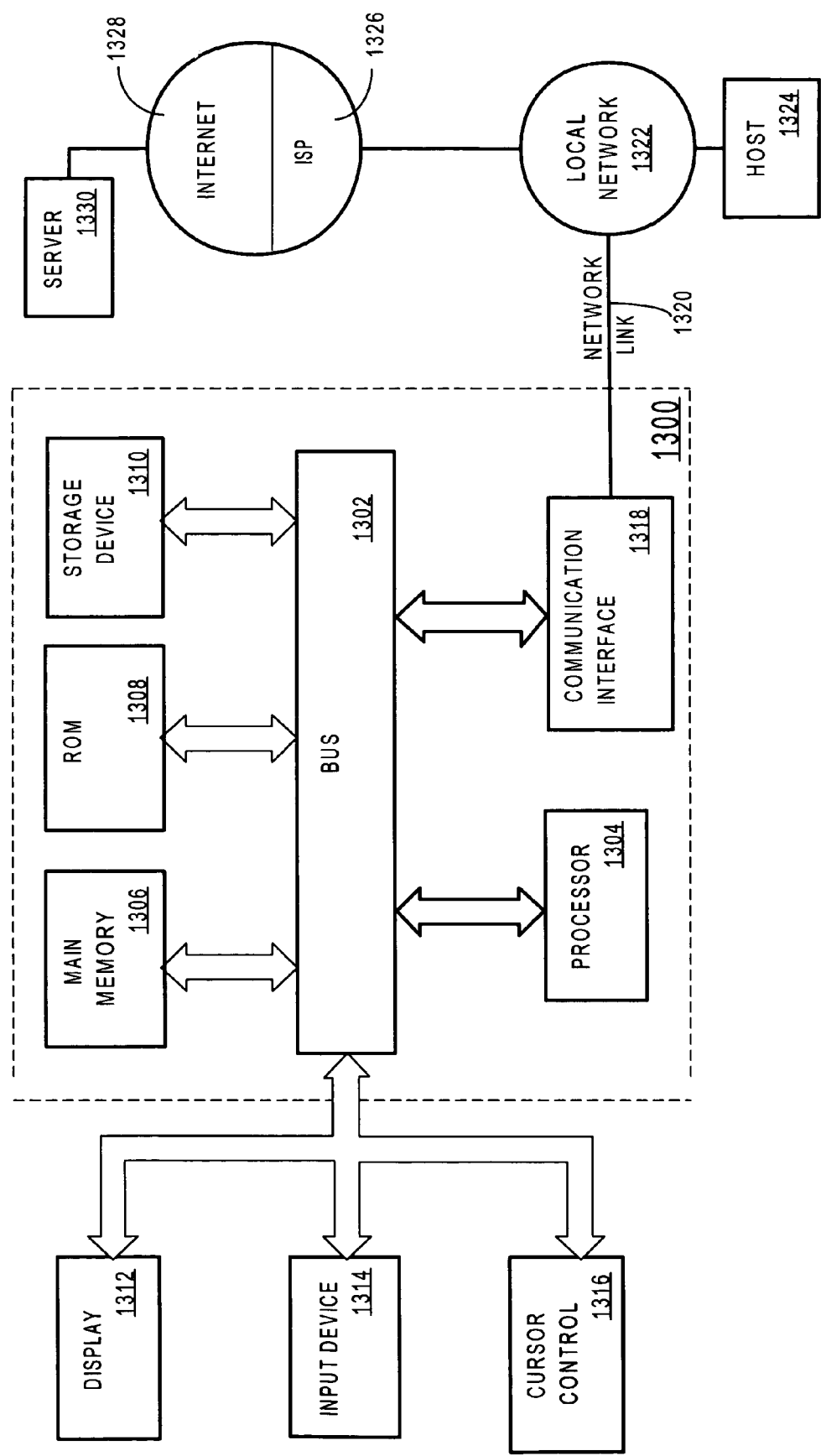
FIG. 13 is a block diagram of a computer system that may be used to implement embodiments of the invention.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 137, such as a magnetic disk or optical disk, is provided and coupled to bus 1302 for storing information and instructions.

Computer system 1300 may be coupled via bus 1302 to a display 139, such as a cathode ray tube (CRT), for displaying information to a computer user. An input device 1311, including alphanumeric and other keys, is coupled to bus 1302 for communicating information and command selections to processor 1304. Another type of user input device is cursor control 1313, such as a mouse, a trackball, or cursor direction keys for communicating direction information and command selections to processor 1304 and for controlling cursor movement on display 139. This input device typically has two degrees of freedom in two axes, a first axis (e.g., x) and a second axis (e.g., y), that allows the device to specify positions in a plane.

The invention is related to the use of computer system 1300 for implementing the techniques described herein. According to one embodiment of the invention, those techniques are performed by computer system 1300 in response to processor 1304 executing one or more sequences of one or more instructions contained in main memory 1306. Such instructions may be read into main memory 1306 from another computer-readable medium, such as storage device 137. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software. The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 137. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 137 either before or after execution by processor 1304.

Computer system 1300 also includes a communication interface 1315 coupled to bus 1302. Communication interface 1315 provides a two-way data communication coupling to a network link 1317 that is connected to a local network 1319. For example, communication interface 1315 may be an integrated services digital network (ISDN) card or a modem to provide a data communication connection to a corresponding type of telephone line. As another example, communication interface 1315 may be a local area network (LAN) card to provide a data communication connection to a compatible LAN. Wireless links may also be implemented. In any such implementation, communication interface 1315 sends and receives electrical, electromagnetic or optical signals that carry digital data streams representing various types of information.

Network link 1317 typically provides data communication through one or more networks to other data devices. For example, network link 1317 may provide a connection through local network 1319 to a host computer 1321 or to data equipment operated by an Internet Service Provider (ISP) 1323. ISP 1323 in turn provides data communication services through the world wide packet data communication network now commonly referred to as the "Internet" 1325. Local network 1319 and Internet 1325 both use electrical, electromagnetic or optical signals that carry digital data streams. The signals through the various networks and the signals on network link 1317 and through communication interface 1315, which carry the digital data to and from computer system 1300, are exemplary forms of carrier waves transporting the information.

Computer system 1300 can send messages and receive data, including program code, through the network(s), network link 1317 and communication interface 1315. In the Internet example, a server 1327 might transmit a requested code for an application program through Internet 1325, ISP 1323, local network 1319 and communication interface 1315.

The received code may be executed by processor 1304 as it is received, and/or stored in storage device 137, or other non-volatile storage for later execution. In this manner, computer system 1300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of operating a server machine to expand input strings of characters received from client machines that include character input devices, comprising:

storing, in a location accessible to said server machine, one or more mappings between abbreviated substrings and expanded substrings;

receiving, at the server machine, a request to perform a server action including at least one of an email operation, a chat operation, and a calendar operation;

receiving, at the server machine, an unexpanded input string of characters associated with said request from a client machine that includes a character input device, the unexpanded input string including at least one abbreviated substring, each preceded and followed in the unexpanded input string by word delimiters, each abbreviated substring belonging to a set of abbreviated substrings in an applicable mapping of said one or more mappings;

automatically finding one of the abbreviated substrings based on the preceding and following word delimiters;

determining a current time;

determining, based on said applicable mapping and said current time, that the abbreviated substring corresponds to a particular expanded substring of a plurality of substrings by expanding said abbreviated substring to an intermediate expanded substring without regard to said current time and expanding said intermediate expanded substring to said particular expanded substring based on said current time;

producing an expanded input string that is a version of the unexpanded input string with the abbreviated substring replaced by said particular expanded substring; and performing said server action including incorporating said expanded input string into display data associated with said at least one of an email operation, a chat operation, and a calendar operation.

2. The method of claim 1 in which one of the abbreviated substrings begins with a character and represents an expanded substring that begins with the same character and in which the step of determining that the abbreviated substring corresponds to a particular expanded substring comprises:

determining the case of the beginning character in the abbreviated substring; and giving the determined case to the beginning character in the particular expanded substring.

3. The method of claim 1, wherein:

said preceding and following word delimiters include all non-alphanumeric characters to indicate one of said abbreviated substrings.

4. A server machine for expanding input strings of characters received from client machines that include character input devices, the server machine comprising:

a processor; and connecting circuitry for connecting the processor to a user's client machine that includes a character input device;

the processor operating to:

access, in a location accessible to said server machine, one or more mappings between abbreviated substrings and expanded substrings;

receive, at the server machine, a request to perform a server action including at least one of an email operation, a chat operation, and a calendar operation;

receive, at the server machine, an unexpanded input string of characters associated with said request from a client machine that includes a character input device, the unexpanded input string including at least one abbreviated substring, each preceded and followed in the unexpanded input string by word delimiters, each abbreviated substring belonging to a set of abbreviated substrings in an applicable mapping of said one or more mappings;

automatically find one of the abbreviated substrings based on the preceding and following word delimiters;

determine a current time;

determine, based on said applicable mapping and said current time, that the abbreviated substring corresponds to a particular expanded substring of a plurality of substrings by expanding said abbreviated substring to an intermediate expanded substring without regard to said current time and expanding said intermediate expanded substring to said particular expanded substring based on said current time;

produce an expanded input string that is a version of the unexpanded input string with the abbreviated substring replaced by said particular expanded substring; and perform said server action including incorporating said expanded input string into display data associated with said at least one of an email operation, a chat operation, and a calendar operation.

5. A method of performing a server action that requires user input, the method comprising the steps of:

storing, at a location accessible to a server machine, one or more mappings between abbreviated substrings and expanded substrings;

receiving, at the server machine, a request to perform said server action, said server action including at least one of an email operation, a chat operation, and a calendar operation;

receiving from a client machine an unexpanded input string that includes an abbreviated substring associated with said request;

determining whether said abbreviated substring is constrained to be identically produced;

if said abbreviated substring is constrained to be identically produced, then performing said server action using said abbreviated substring without expanding said abbreviated substring; and if said abbreviated substring is not constrained to be identically produced, then performing the steps of determining a current time;

inspecting a mapping, of said one or more mappings, to determine from a plurality of substrings an expanded substring that corresponds to said abbreviated substring based on said current time by expanding said abbreviated substring to an intermediate expanded substring without regard to said current time and expanding said intermediate expanded substring to said expanded substring based on said current time; and performing said server action including incorporating said expanded substring into display data associated with said at least one of an email operation, a chat operation, and a calendar operation.

6. The method of claim 5 wherein:

the client machine is operated by a particular user; and the method further includes the step of determining which mapping of said one or more mappings to inspect based on identity of said particular user.

7. The method of claim 6 wherein the step of determining which mapping to inspect includes the steps of:

identifying which group of a plurality of groups includes said particular user, and identifying a mapping associated with the group that includes said particular user.

8. The method of claim 5 further comprising the step of determining which mapping of said one or more mappings to inspect based on which type of server action is requested by said client machine.

9. The method of claim 5 wherein the step of performing said server action using said expanded substring is performed without sending said expanded substring to said client machine.

10. A computer-readable medium carrying instructions for performing a server action that requires user input, the instructions including instructions for performing the steps of:

storing, at a location accessible to a server machine, one or more mappings between abbreviated substrings and expanded substrings;

receiving, at the server machine, a request to perform a server action including at least one of an email operation, a chat operation, and a calendar operation;

receiving from a client machine an unexpanded input string that includes an abbreviated substring associated with said request;

determining whether said abbreviated substring is constrained to be identically produced;

if said abbreviated substring is constrained to be identically produced, then performing said server action using said abbreviated substring without expanding said abbreviated substring; and if said abbreviated substring is not constrained to be identically produced, then performing the steps of determining a current time;

inspecting a mapping, of said one or more mappings, to determine from a plurality of substrings an expanded substring that corresponds to said abbreviated substring based on said current time by expanding said abbreviated substring to an intermediate expanded substring without regard to said current time and expanding said intermediate expanded substring to said expanded substring based on said current time; and performing said server action including incorporating said expanded substring into display data associated with said at least one of an email operation, a chat operation, and a calendar operation.

11. The computer-readable medium of claim 10 wherein:

the client machine is operated by a particular user; and the computer-readable medium further includes the step of determining which mapping of said one or more mappings to inspect based on identity of said particular user.

12. The computer-readable medium of claim 11 wherein the step of determining which mapping to inspect includes the steps of:

identifying which group of a plurality of groups includes said particular user, and identifying a mapping associated with the group that includes said particular user.

13. The computer-readable medium of claim 10 further comprising the step of determining which mapping of said one or more mappings to inspect based on which type of server action is requested by said client machine.

14. The computer-readable medium of claim 10 wherein the step of performing said server action using said expanded substring is performed without sending said expanded substring to said client machine.

* * * * *